(12) United States Patent
Russell et al.

(10) Patent No.: US 11,698,557 B2
(45) Date of Patent: Jul. 11, 2023

(54) GEOMETRIES FOR MITIGATING ARTIFACTS IN SEE-THROUGH PIXEL ARRAYS

(71) Applicant: Magic Leap, Inc., Plantation, FL (US)

(72) Inventors: Andrew Ian Russell, Weston, FL (US); Jahja I. Trisnadi, Cupertino, CA (US); Vaibhav Mathur, Weston, FL (US); David Manly, Fort Lauderdale, FL (US); Michael Robert Johnson, Plantation, FL (US); Clinton Carlisle, Parkland, FL (US)

(73) Assignee: Magic Leap, Inc., Plantation, FL (US)

( * ) Notice: Subject to any disclaimer, the term of this patent is extended or adjusted under 35 U.S.C. 154(b) by 48 days.

(21) Appl. No.: 16/920,332

(22) Filed: Jul. 2, 2020

(65) Prior Publication Data
US 2021/0003872 A1     Jan. 7, 2021

Related U.S. Application Data

(60) Provisional application No. 62/870,896, filed on Jul. 5, 2019.

(51) Int. Cl.
*G02F 1/1345*     (2006.01)
*G02F 1/1343*     (2006.01)
(Continued)

(52) U.S. Cl.
CPC ....... *G02F 1/1345* (2013.01); *G02B 27/0172* (2013.01); *G02F 1/1393* (2013.01);
(Continued)

(58) Field of Classification Search
CPC combination set(s) only.
See application file for complete search history.

(56) References Cited

U.S. PATENT DOCUMENTS 10,935,853 B1 *   3/2021   den Boer .......... G02F 1/133514
2005/0140893 A1 *  6/2005   Hong ................ G02F 1/136286
                                                    349/139
(Continued)

FOREIGN PATENT DOCUMENTS

WO     2021007116 A1     1/2021

OTHER PUBLICATIONS

PCT/US2020/040778, "International Search Report and Written Opinion", dated Sep. 28, 2020, 14 pages.
(Continued)

*Primary Examiner* — Alexander P Gross
(74) *Attorney, Agent, or Firm* — Kilpatrick Townsend & Stockton LLP

(57) ABSTRACT

Disclosed are dimming assemblies and display systems for reducing artifacts produced by optically-transmissive displays. A system may include a substrate upon which a plurality of electronic components are disposed. The electronic components may include a plurality of pixels, a plurality of conductors, and a plurality of circuit modules. The plurality of pixels may be arranged in a two-dimensional array, with each pixel having a two-dimensional geometry corresponding to a shape with at least one curved side. The plurality of conductors may be arranged adjacent to the plurality of pixels. The system may also include control circuitry electrically coupled to the plurality of conductors. The control circuitry may be configured to apply electrical signals to the plurality of circuit modules by way of the plurality of conductors.

20 Claims, 27 Drawing Sheets

(51) Int. Cl.
*G02B 27/01* (2006.01)
*G02F 1/139* (2006.01)
*G02F 1/1362* (2006.01)
*G02F 1/1335* (2006.01)
*G02C 7/10* (2006.01)

(52) U.S. Cl.
CPC .. *G02F 1/133512* (2013.01); *G02F 1/134336* (2013.01); *G02B 2027/0118* (2013.01); *G02B 2027/0178* (2013.01); *G02C 7/101* (2013.01); *G02F 1/134309* (2013.01); *G02F 1/136286* (2013.01)

(56) References Cited

U.S. PATENT DOCUMENTS

| | | | | |
|---|---|---|---|---|
| 2005/0219436 | A1* | 10/2005 | Kwon | G02F 1/136209 349/44 |
| 2008/0068524 | A1* | 3/2008 | Kim | G02F 1/136286 349/139 |
| 2012/0113339 | A1* | 5/2012 | Park | G06F 3/0445 349/33 |
| 2014/0098308 | A1* | 4/2014 | Wu | G02F 1/136286 349/15 |
| 2015/0168773 | A1* | 6/2015 | Chen | H01L 27/1259 349/106 |
| 2017/0176753 | A1 | 6/2017 | Shi et al. | |
| 2017/0221196 | A1 | 8/2017 | Yamaguchi et al. | |
| 2017/0293141 | A1 | 10/2017 | Schowengerdt et al. | |
| 2018/0246314 | A1 | 8/2018 | Swager et al. | |
| 2019/0004388 | A1 | 1/2019 | Qiu et al. | |
| 2019/0101803 | A1* | 4/2019 | Numata | G02F 1/1343 |
| 2019/0146244 | A1* | 5/2019 | Cano | G02F 1/136286 351/159.39 |
| 2020/0074724 | A1 | 3/2020 | Mathur et al. | |
| 2020/0292894 | A1* | 9/2020 | Liu | G02F 1/13306 |

OTHER PUBLICATIONS

Application No. PCT/US2020/040778, International Preliminary Report on Patentability, dated Jan. 20, 2022, 13 pages.
Application No. EP20836581.7, "Extended European Search Report", dated Jun. 10, 2022, 15 pages.

* cited by examiner

GEOMETRIES FOR MITIGATING ARTIFACTS IN SEE-THROUGH PIXEL ARRAYS

CROSS-REFERENCES TO RELATED APPLICATIONS

This application claims the benefit of priority to U.S. Provisional Patent Application No. 62/870,896, filed Jul. 5, 2019, entitled "GEOMETRIES FOR MITIGATING ARTIFACTS IN SEE-THROUGH PIXEL ARRAYS," the entire content of which is incorporated herein by reference for all purposes

INCORPORATION BY REFERENCE

This application incorporates by reference the entirety of each of the following patent applications: U.S. patent application Ser. No. 15/479,700, filed on Apr. 5, 2017, published on Oct. 12, 2017 as U.S. Publication No. 2017/0293141; U.S. Provisional Patent Application Ser. No. 62/725,993, entitled SPATIALLY-RESOLVED DYNAMIC DIMMING FOR AUGMENTED REALITY DEVICE, filed on Aug. 31, 2018; U.S. Provisional Patent Application Ser. No. 62/731,755, entitled SYSTEMS AND METHODS FOR EXTERNAL LIGHT MANAGEMENT, filed on Sep. 14, 2018; and U.S. Provisional Patent Application Ser. No. 62/858,252, entitled SPATIALLY-RESOLVED DYNAMIC DIMMING FOR AUGMENTED REALITY DEVICE, filed on Jun. 6, 2019.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

BRIEF SUMMARY OF THE INVENTION

The present disclosure relates generally to techniques for improving optical systems in a wide range of ambient light conditions. More particularly, embodiments of the present disclosure provide systems and methods for operating an augmented reality (AR) device comprising a dimming element that reduces artifacts due to real-world light sources. Although the present disclosure is described in reference to an AR device, the disclosure is applicable to a variety of applications in computer vision and image display systems.

A summary of the invention is provided below in reference to a list of examples. As used below, any reference to a series of examples is to be understood as a reference to each of those examples disjunctively (e.g., "Examples 1-4" is to be understood as "Examples 1, 2, 3, or 4").

Example 1 is a dimming assembly comprising: an optically-transmissive substrate upon which a plurality of electronic components are disposed, the electronic components comprising: a plurality of electrodes that are arranged spaced apart from one another in a two-dimensional array, wherein each of the plurality of electrodes has a two-dimensional geometry corresponding to a shape with a plurality of curved sides; a plurality of conductors that are arranged adjacent to the plurality of electrodes in a two-dimensional lattice, wherein each of the plurality of conductors follows a curving path that conforms to the two-dimensional geometry of adjacent electrodes from the plurality of electrodes; and a plurality of circuit modules that are arranged adjacent to the plurality of electrodes in a two-dimensional array, wherein each of the plurality of circuit modules is electrically coupled to (i) a respective electrode from the plurality of electrodes, and (ii) a respective pair of conductors from the plurality of conductors; a planar electrode layer that is positioned in alignment with the plurality of electrodes; one or more layers that are positioned between the optically-transmissive substrate and the planar electrode layer, wherein the one or more layers comprise one or more layers of material that respond to electric fields; and control circuitry electrically coupled to the plurality of conductors and the planar electrode layer, the control circuitry configured to apply electrical signals to the plurality of circuit modules by way of the plurality of conductors to selectively generate one or more electric fields between the planar electrode layer and one or more of the plurality of electrodes in the two-dimensional array, respectively.

Example 2 is a display system comprising: a substrate upon which a plurality of electronic components are disposed, the electronic components comprising: a plurality of pixels that are arranged in a two-dimensional array, wherein each of the plurality of pixels has a two-dimensional geometry corresponding to a shape with at least one curved side; a plurality of conductors that are arranged adjacent to the plurality of pixels; and a plurality of circuit modules that are arranged adjacent to the plurality of pixels, wherein each of the plurality of circuit modules is electrically coupled to a respective pixel from the plurality of pixels and at least one conductor from the plurality of conductors; and control circuitry electrically coupled to the plurality of conductors, the control circuitry configured to apply electrical signals to the plurality of circuit modules by way of the plurality of conductors.

Example 3 is the display system of example(s) 2, wherein each of the plurality of conductors follows a curving path that conforms to the two-dimensional geometry of adjacent pixels from the plurality of pixels.

Example 4 is the display system of example(s) 2-3, wherein the substrate is an optically-transmissive substrate.

Example 5 is the display system of example(s) 2-4, wherein the plurality of pixels are a plurality of electrodes.

Example 6 is the display system of example(s) 2-5, further comprising: a planar electrode layer that is positioned in alignment with the plurality of pixels.

Example 7 is the display system of example(s) 2-6, further comprising: one or more layers that are positioned between the substrate and the planar electrode layer, wherein the one or more layers comprise one or more layers of material that respond to electric fields.

Example 8 is the display system of example(s) 2-7, wherein the control circuitry is further electrically coupled to the planar electrode layer.

Example 9 is the display system of example(s) 2-8, wherein the control circuitry configured to apply electrical signals to the plurality of circuit modules by way of the plurality of conductors to selectively generate one or more electric fields between the planar electrode layer and one or more of the plurality of pixels in the two-dimensional array, respectively.

Example 10 is the display system of example(s) 2-9, wherein each of the plurality of circuit modules is electrically coupled to a pair of conductors from the plurality of conductors.

Example 11 is the display system of example(s) 2-10, wherein each of the shapes includes a plurality of curved sides.

Example 12 is the display system of example(s) 2-11, wherein the plurality of pixels form a particular tessellation.

Example 13 is a display system comprising: a first optically-transmissive substrate upon which a first set of one or more electrodes are disposed; a second optically-transmissive substrate upon which a second set of one or more electrodes are disposed; one or more layers that are positioned between the first set of one or more electrodes and the second set of one or more electrodes, wherein the one or more layers comprise one or more layers of material that respond to electric fields; a quantity of material disposed in a particular geometric pattern over the second optically-transmissive substrate, the particular geometric pattern including a plurality of curved segments; and control circuitry electrically coupled to the first set of one or more electrodes and the second set of one or more electrodes, the control circuitry configured to apply electrical signals to one or both of the first and second sets of one or more electrodes to selectively generate one or more electric fields across the one or more layers.

Example 14 is the display system of example(s) 13, wherein each of the plurality of curved segments is disposed in alignment with an edge of a respective electrode from the first set of one or more electrodes or the second set of one or more electrodes.

Example 15 is the display system of example(s) 13-14, wherein the edge of the respective electrode with which each of the plurality of curved segments is aligned has a curved geometry.

Example 16 is the display system of example(s) 13-15, wherein the curved geometry is semicircular, serpentine, sinusoidal, or a combination thereof.

Example 17 is the display system of example(s) 13-16, wherein the edge of the respective electrode with which each of the plurality of curved segments is aligned corresponds to a sinuosity value that is less than or equal to a value of 1.02.

Example 18 is the display system of example(s) 13-17, wherein the quantity of material disposed over the second optically-transmissive substrate comprises a quantity of resin or chromium.

Example 19 is the display system of example(s) 13-18, wherein a point spread function (PSF) of the particular geometric pattern corresponds to an Airy pattern.

Example 20 is the display system of example(s) 13-19, wherein the particular geometric pattern corresponds to a particular tessellation.

Example 21 is a display system comprising: a first driver circuit; a second driver circuit; an optically-transmissive substrate; electronic components disposed upon the optically-transmissive substrate, the electronic components comprising: a plurality of electrodes that are arranged in a two-dimensional array, each of which has a two-dimensional geometry corresponding to a shape with a plurality of curved sides, wherein the plurality of electrodes are arranged spaced apart from one another in the two-dimensional array so as to define a plurality of curving channels therebetween; a plurality of conductors that are distributed throughout the plurality of curving channels, respectively, wherein each conductor is arranged within a respective one of the plurality of curving channels and spans a length of the respective curving channel, wherein the plurality of conductors comprise: a first set of conductors that are electrically coupled to the first driver circuit; a second set of conductors that are electrically coupled to the second driver circuit; a plurality of circuit modules that are arranged within the plurality of curving channels, wherein each circuit module is electrically coupled to (i) a respective one of the plurality of electrodes, and (ii) the first and second driver circuits by way of two of the plurality of conductors; and a plurality of layers that are arranged adjacent to the optically-transmissive substrate, the plurality of layers comprising: a planar electrode layer that is positioned in alignment with the plurality of electrodes.

Example 22 is the display system, wherein the shape to which the two-dimensional geometry of each electrode corresponds comprises a shape that tessellates.

Example 23 is the display system of example(s) 21-22, wherein the plurality of curved sides of the shape to which the two-dimensional geometry of each electrode corresponds comprise at least one convexly curved side and at least one concavely curved side.

Example 24 is the display system of example(s) 21-23, wherein at least one of the plurality of curving channels is serpentine in shape.

Example 25 is the display system of example(s) 21-24, wherein at least one of the plurality of curving channels has a sinuosity value is greater than or equal to a value of 1.02.

Example 26 is the display system of example(s) 21-25, wherein the sinuosity value is greater than or equal to a value of 1.04.

Example 27 is the display system of example(s) 21-26, wherein the sinuosity value is greater than or equal to a value of 1.1.

Example 28 is the display system of example(s) 21-27, wherein the sinuosity value is greater than or equal to a value of 1.2.

Example 29 is the display system of example(s) 21-28, wherein the sinuosity value is greater than or equal to a value of 1.35.

Example 30 is the display system of example(s) 21-29, wherein the sinuosity value is greater than or equal to a value of 1.5.

Example 31 is the display system of example(s) 21-30, wherein at least one of the plurality of curving channels is sinusoidal in shape.

Example 32 is the display system of example(s) 21-31, wherein each circuit module includes at least one transistor.

Example 33 is the display system of example(s) 21-32, wherein the at least one transistor comprises a thin film transistor (TFT).

Example 34 is the display system of example(s) 21-33, wherein the at least one transistor includes: a gate terminal that is electrically coupled to the first driver circuit; a source terminal that is electrically coupled to the second driver circuit; and a drain terminal that is electrically coupled to the respective one of the plurality of electrodes.

Example 35 is the display system of example(s) 21-34, wherein the at least one transistor is positioned at an intersection of two or more of the plurality of curving channels.

Example 36 is the display system of example(s) 21-35, wherein the plurality of layers further comprise: one or more layers of liquid crystal that are positioned between the optically-transmissive substrate and the planar electrode layer.

Example 37 is the display system of example(s) 21-36, further comprising a pair of polarizers, wherein the optically-transmissive substrate and the plurality of layers are positioned between the pair of polarizers.

Example 38 is the display system of example(s) 21-37, wherein the plurality of layers further comprise: one or more organic light-emitting layers that are positioned between the optically-transmissive substrate and the planar electrode layer.

Example 39 is the display system of example(s) 21-38, wherein the plurality of electrodes and the planar electrode layer are made out of indium tin oxide (ITO).

Example 40 is the display system of example(s) 21-39, wherein the optically-transmissive substrate comprises a glass substrate.

Example 41 is the display system of example(s) 21-40, wherein the plurality of curving channels comprise: a first set of curving channels that do not intersect with one another; a second set of curving channels that do not intersect with one another, wherein at least a portion of the second set of curving channels intersect with at least a portion of the first set of curving channels.

Example 42 is the display system of example(s) 21-41, wherein the first set of conductors are arranged within the first set of curving channels and the second set of conductors are arranged within the second set of curving channels.

Example 43 is the display system of example(s) 21-42, wherein the first and second sets of conductors are insulated from one another.

Example 44 is the display system of example(s) 21-43, wherein one or both of the first and second driver circuits are formed on the optically-transmissive substrate.

Numerous benefits are achieved by way of the present disclosure over conventional techniques. For example, embodiments described herein reduce the noticeability of diffraction spikes produced by pixelated dimming elements in see-through display systems. Furthermore, dimming techniques described herein allow AR devices to be used in a wide range of light levels, from dark indoors to bright outdoors, by globally dimming and/or selectively dimming the ambient light reaching the user's eyes. Embodiments of the present disclosure further allow for AR and virtual reality (VR) capabilities in a single device by using the pixelated dimmer to attenuate the world light by greater than 99%. Other benefits of the present disclosure will be readily apparent to those skilled in the art.

DETAILED DESCRIPTION OF THE INVENTION

One challenge with optical-see-through augmented reality (AR) devices has been the variation in the opacity and/or visibility of the virtual content under varying ambient light conditions. The problem worsens in extreme lighting conditions such as a completely dark room or outside in full bright sunlight. One solution is to dim the world light at different spatial locations within the field of view of the AR device. The portion of the field of view to which dimming is applied and the amount of dimming that is applied may each be determined based on various information detected by the AR device. This information may include detected ambient light, detected gaze information, and/or the detected brightness or location of the virtual content being projected.

For dimming systems that employ an optically-transmissive display with an array of pixels, such as an optically-transmissive controllable dimming assembly, an optically-transmissive liquid crystal display (LCD), and/or an optically-transmissive organic light-emitting diode (OLED) display, a user may observe spikes or streaks emanating from various light sources in the real world. More specifically, the array of pixels in an optically-transmissive spatial light modulator or display may interact with light in a manner similar to that of a "cross screen" or a "star" photographic filter by virtue of its geometry, such that a distinct number of diffraction spikes are produced around light sources in the real world.

Embodiments described herein provide techniques that reduce the noticeability of diffraction spikes produced by optically-transmissive spatial light modulators or displays in see-through display systems. In some embodiments, dimming assemblies with pixels having curved geometries are provided. Each pixel may be comprised of an electrode with a shape having at least one curved side. The pixels may form a two-dimensional array that is disposed onto an optically-transmissive substrate. Dimming assemblies may further include conductors that run across the pixel arrays and adhere to the particular curved geometries. Control circuitry that is electrically coupled to a pixel array may apply electrical signals to generate electric fields across various layers of a dimming assembly.

Figure 1:
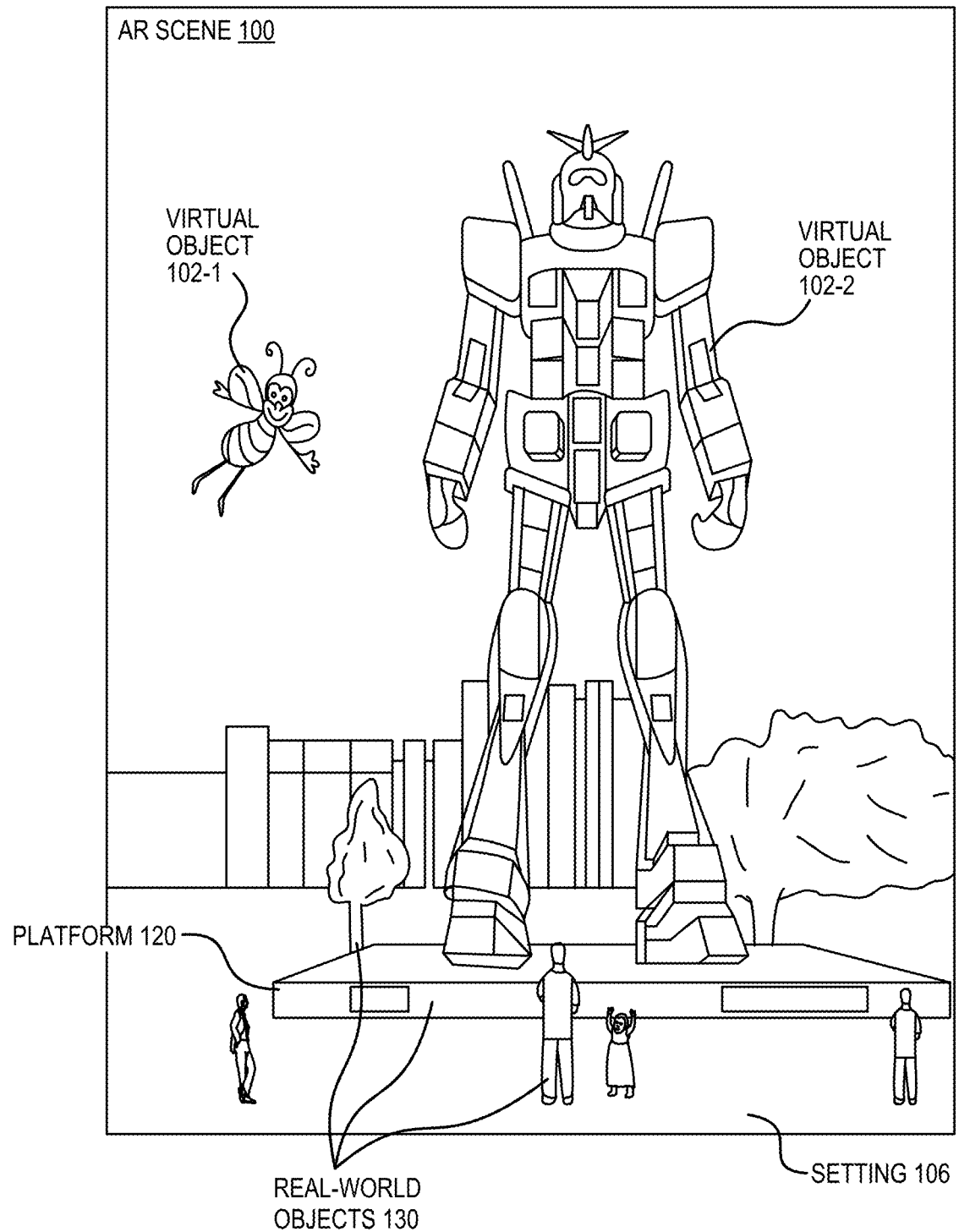
FIG. 1 illustrates an augmented reality (AR) scene as viewed through a wearable AR device.

FIG. 1 illustrates an AR scene 100 as viewed through a wearable AR device, according to some embodiments. AR scene 100 is depicted wherein a user of an AR technology sees a real-world park-like setting 106 featuring various real-world objects 130 such as people, trees, buildings in the background, and a real-world concrete platform 120. In addition to these items, the user of the AR technology also perceives that they "see" various virtual objects 102 such as a robot statue 102-2 standing upon the real-world concrete platform 120, and a cartoon-like avatar character 102-1 flying by, which seems to be a personification of a bumble bee, even though these elements (character 102-1 and statue 102-2) do not exist in the real world. Due to the extreme complexity of the human visual perception and nervous system, it is challenging to produce a virtual reality (VR) or AR technology that facilitates a comfortable, natural-feeling, rich presentation of virtual image elements amongst other virtual or real-world imagery elements.

Figure 2A:
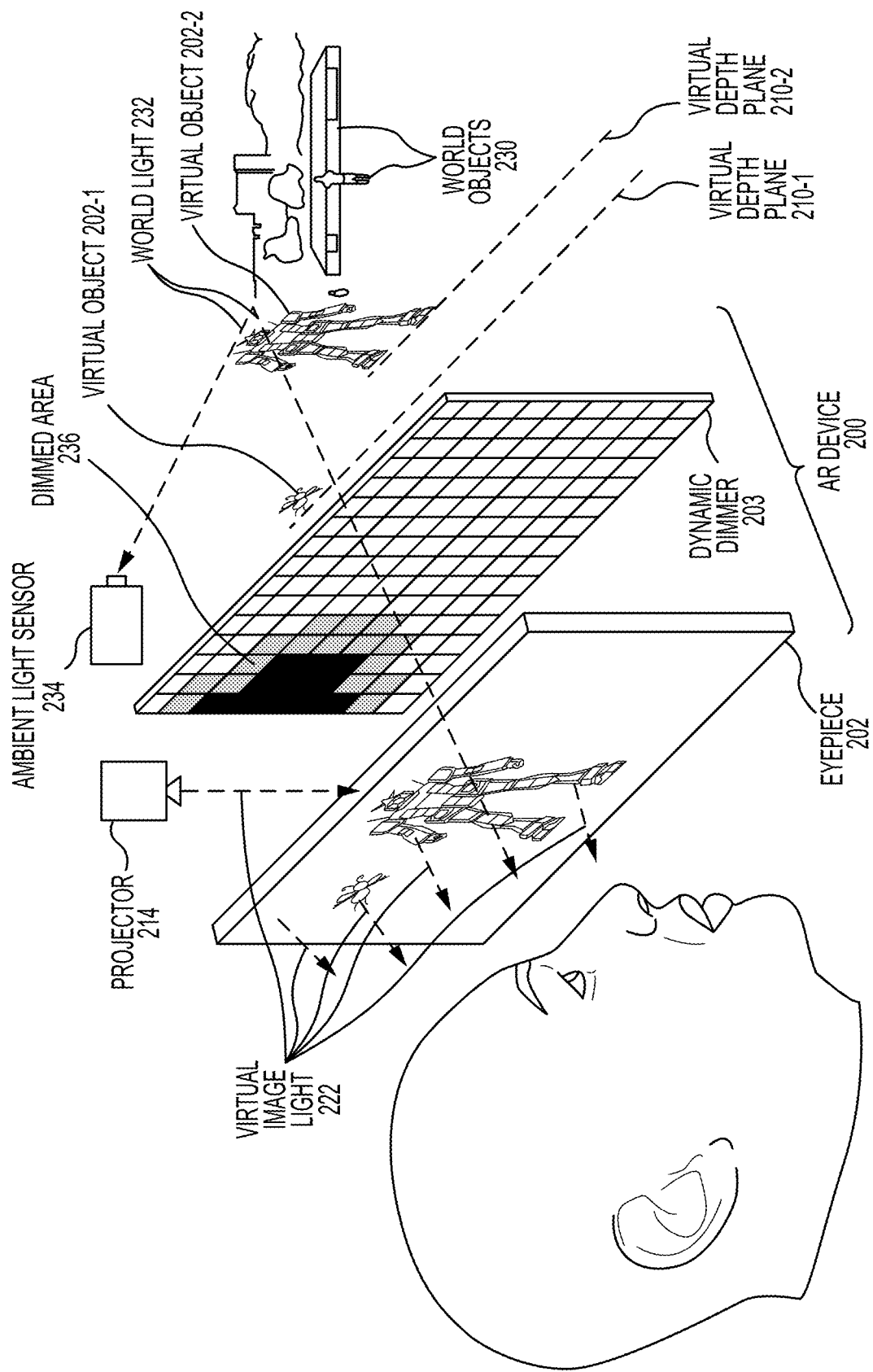
FIG. 2A illustrates various features of an AR device.

FIG. 2A illustrates various features of an AR device 200, according to some embodiments of the present disclosure. In some embodiments, an AR device 200 may include an eyepiece 202 and a dynamic dimmer 203 configured to be transparent or semi-transparent when AR device 200 is in an inactive mode or an off mode such that a user may view one or more world objects 230 when looking through eyepiece 202 and dynamic dimmer 203. As illustrated, eyepiece 202 and dynamic dimmer 203 may be arranged in a side-by-side configuration and may form a system field of view that a user sees when looking through eyepiece 202 and dynamic dimmer 203. In some embodiments, the system field of view is defined as the entire two-dimensional region occupied by one or both of eyepiece 202 and dynamic dimmer 203. Although FIG. 2A illustrates a single eyepiece 202 and a single dynamic dimmer 203 for purposes of simplicity, it should be understood that AR device 200 may include two eyepieces and two dynamic dimmers, one for each eye of a user.

During operation, dynamic dimmer 203 may be adjusted to reduce an intensity of a world light 232 associated with world objects 230 impinging on dynamic dimmer 203, thereby producing a dimmed area 236 within the system field of view. Dimmed area 236 may be a portion or subset of the system field of view, and may be partially or completely dimmed. Dynamic dimmer 203 may be adjusted according to a plurality of spatially-resolved dimming values for dimmed area 236. Furthermore, during operation of AR device 200, projector 214 may project a virtual image light 222 (i.e., light associated with virtual content) onto eyepiece 202 which may be observed by the user along with world light 232.

Projecting virtual image light 222 onto eyepiece 202 may cause a light field (i.e., an angular representation of virtual content) to be projected onto the user's retina in a manner such that the user perceives the corresponding virtual content as being positioned at some location within the user's environment. For example, virtual image light 222 outcoupled by eyepiece 202 may cause the user to perceive character 202-1 as being positioned at a first virtual depth plane 210-1 and statue 202-2 as being positioned at a second virtual depth plane 210-2. The user perceives the virtual content along with world light 232 corresponding to one or more world objects 230, such as platform 120.

In some embodiments, AR device 200 may include an ambient light sensor 234 configured to detect world light 232. Ambient light sensor 234 may be positioned such that world light 232 detected by ambient light sensor 234 is similar to and/or representative of world light 232 that impinges on dynamic dimmer 203 and/or eyepiece 202. In some embodiments, ambient light sensor 234 may be configured to detect a plurality of spatially-resolved light values corresponding to different pixels of dynamic dimmer 203. In these embodiments, ambient light sensor 234 may, for example, correspond to an imaging sensor (e.g., CMOS, CCD, etc.) or a plurality of photodiodes (e.g., in an array or another spatially-distributed arrangement). In some embodiments, or in the same embodiments, ambient light sensor 234 may be configured to detect a global light value corresponding to an average light intensity or a single light intensity of world light 232. In these embodiments, ambient light sensor 234 may, for example, correspond to a set of one or more photodiodes. Other possibilities are contemplated.

Figure 2B:
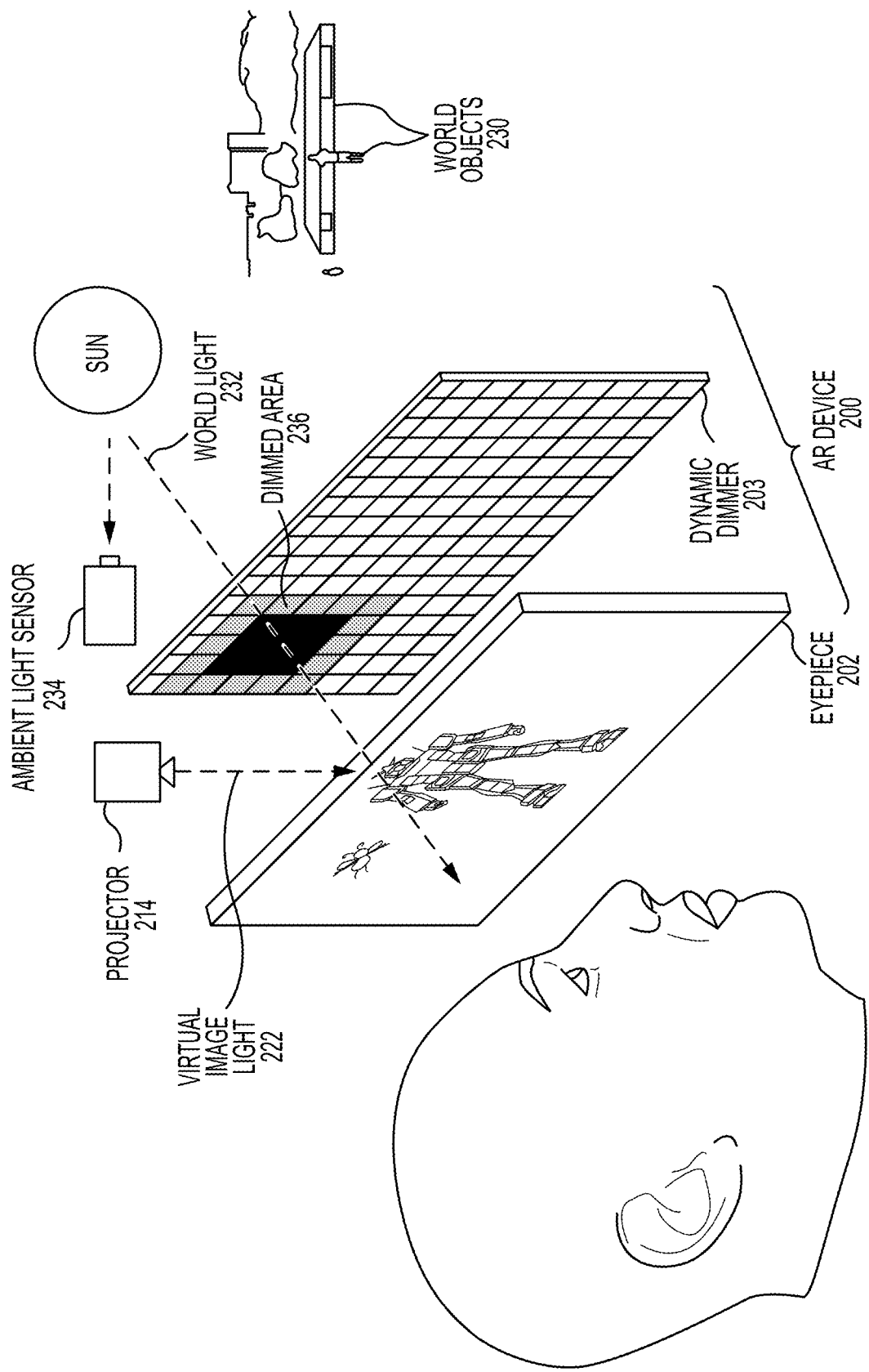
FIG. 2B illustrates an example of an AR device in which a dimmed area is determined based on detected light information.

FIG. 2B illustrates an example of AR device 200 in which dimmed area 236 is determined based on detected light information corresponding to world light 232. Specifically, ambient light sensor 234 may detect world light 232 associated with the sun and may further detect a direction and/or a portion of the system field of view at which world light 232 associated with the sun passes through AR device 200. In response, dynamic dimmer 203 may be adjusted to set dimmed area 236 to cover a portion of the system field of view corresponding to the detected world light. As illustrated, dynamic dimmer 203 may be adjusted so as to reduce the intensity of world light 232 at the center of dimmed area 236 at a greater amount than the extremities of dimmed area 236.

Figure 2C:
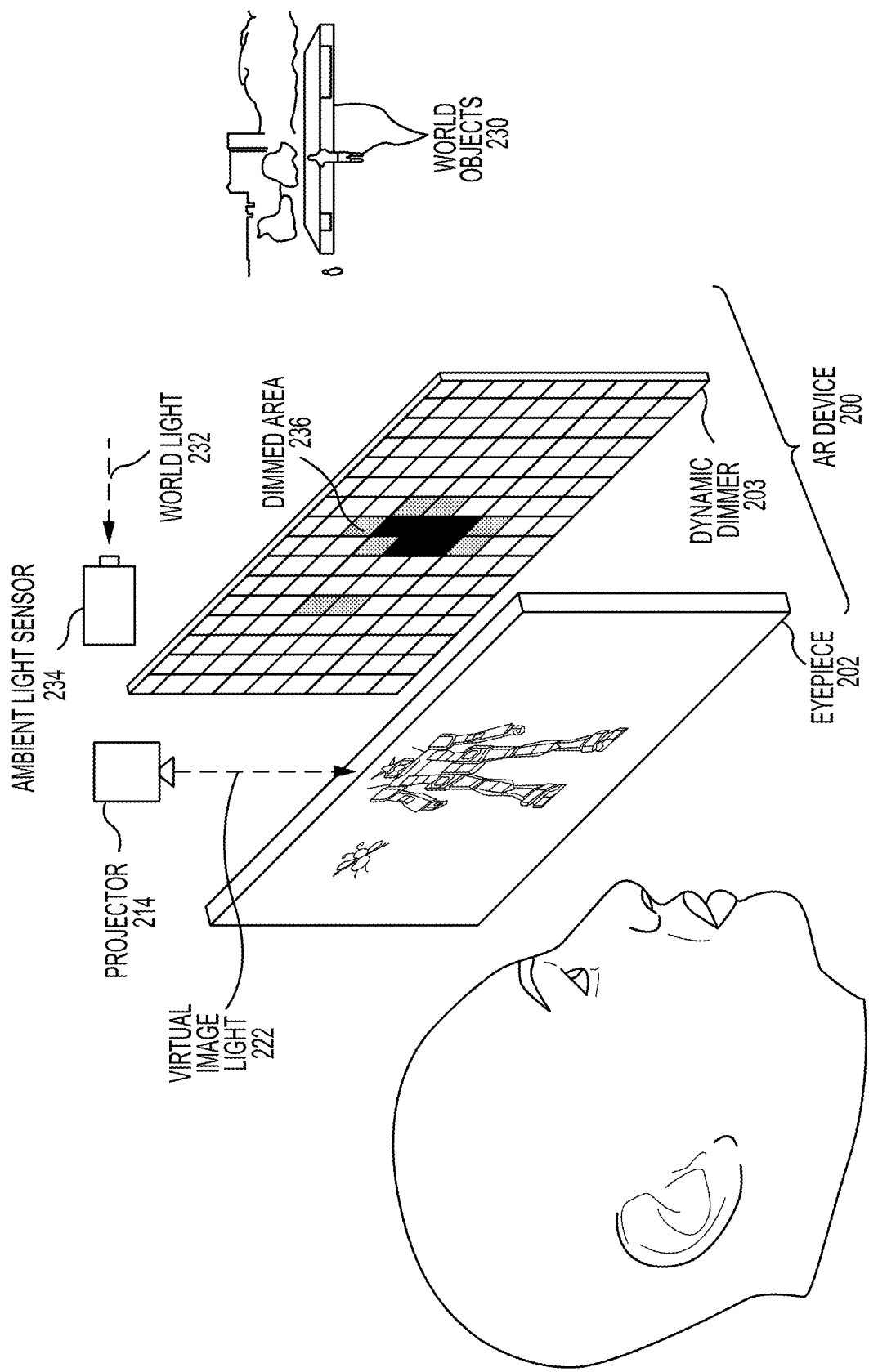
FIG. 2C illustrates an example of an AR device in which a dimmed area is determined based on a virtual image.

FIG. 2C illustrates an example of AR device 200 in which dimmed area 236 is determined based on virtual image light 222. Specifically, dimmed area 236 may be determined based on the virtual content perceived by the user resulting from the user observing virtual image light 222. In some embodiments, AR device 200 may detect image information that includes a location of virtual image light 222 (e.g., a location within dynamic dimmer 203 through which the user perceives the virtual content) and/or a brightness of virtual image light 222 (e.g., a brightness of the perceived virtual content and/or the light generated at projector 214), among other possibilities. As illustrated, dynamic dimmer 203 may be adjusted to set dimmed area 236 to cover a portion of the system field of view corresponding to virtual image light 222 or, alternatively, in some embodiments dimmed area 236 may cover a portion of the system field of view that is not aligned with virtual image light 222. In some embodiments, the dimming values of dimmed area 236 may be determined based on world light 232 detected by ambient light sensor 234 and/or the brightness of virtual image light 222.

Figure 2D:
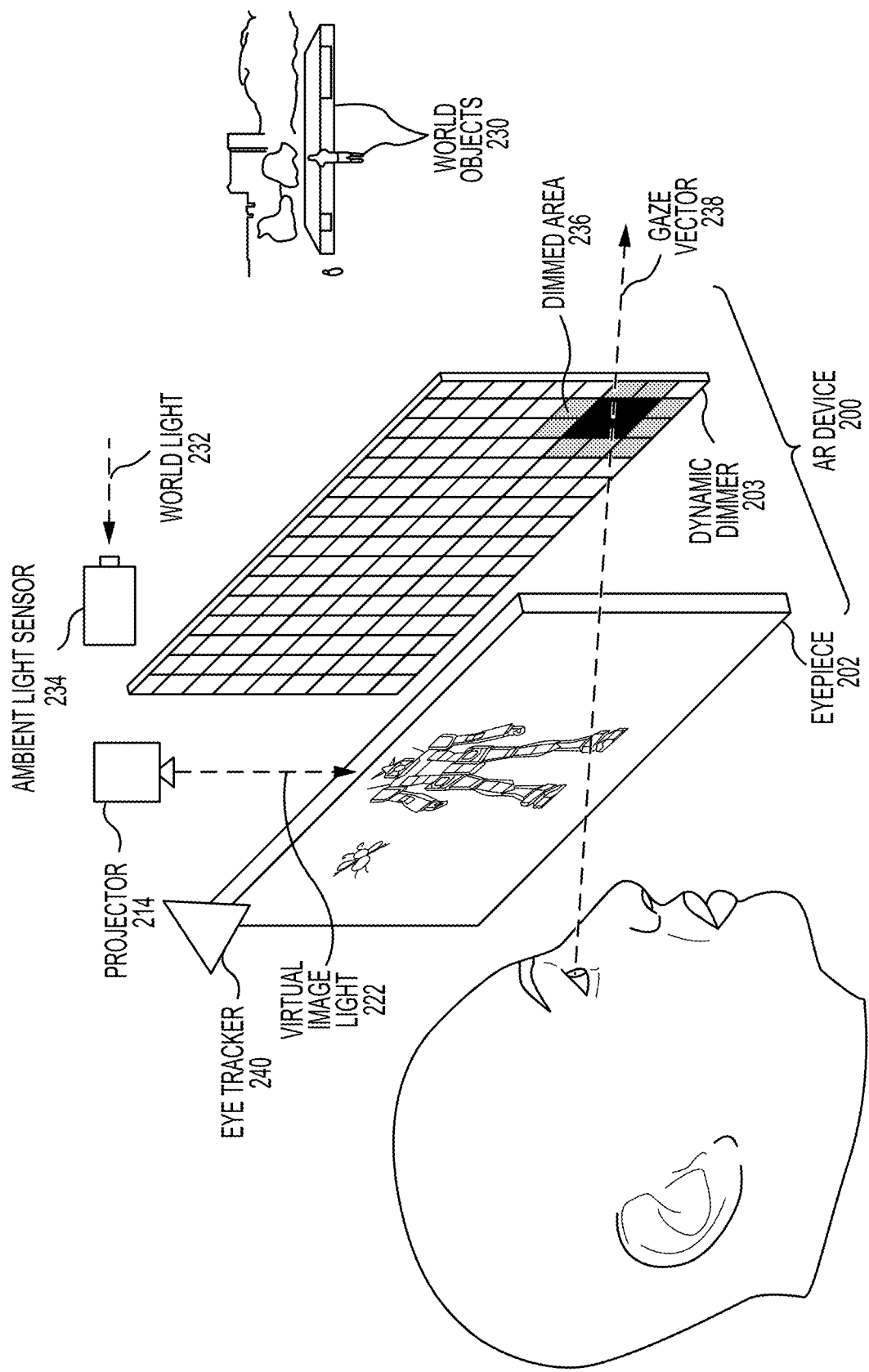
FIG. 2D illustrates an example of an AR device in which a dimmed area is determined based on gaze information.

FIG. 2D illustrates an example of AR device 200 in which dimmed area 236 is determined based on gaze information corresponding to an eye of a user. In some embodiments, the gaze information includes a gaze vector 238 of the user and/or a pixel location of dynamic dimmer 203 at which gaze vector 238 intersects with dynamic dimmer 203. As illustrated, dynamic dimmer 203 may be adjusted to set dimmed area 236 to cover a portion of the system field of view corresponding to an intersection point (or intersection region) between gaze vector 238 and dynamic dimmer 203 or, alternatively, in some embodiments dimmed area 236 may cover a portion of the system field of view that does not correspond to the intersection point (or intersection region) between gaze vector 238 and dynamic dimmer 203. In some embodiments, the dimming values of dimmed area 236 may be determined based on world light 232 detected by ambient light sensor 234 and/or the brightness of virtual image light 222. In some embodiments, gaze information may be detected by an eye tracker 240 mounted to AR device 200.

Figure 3:
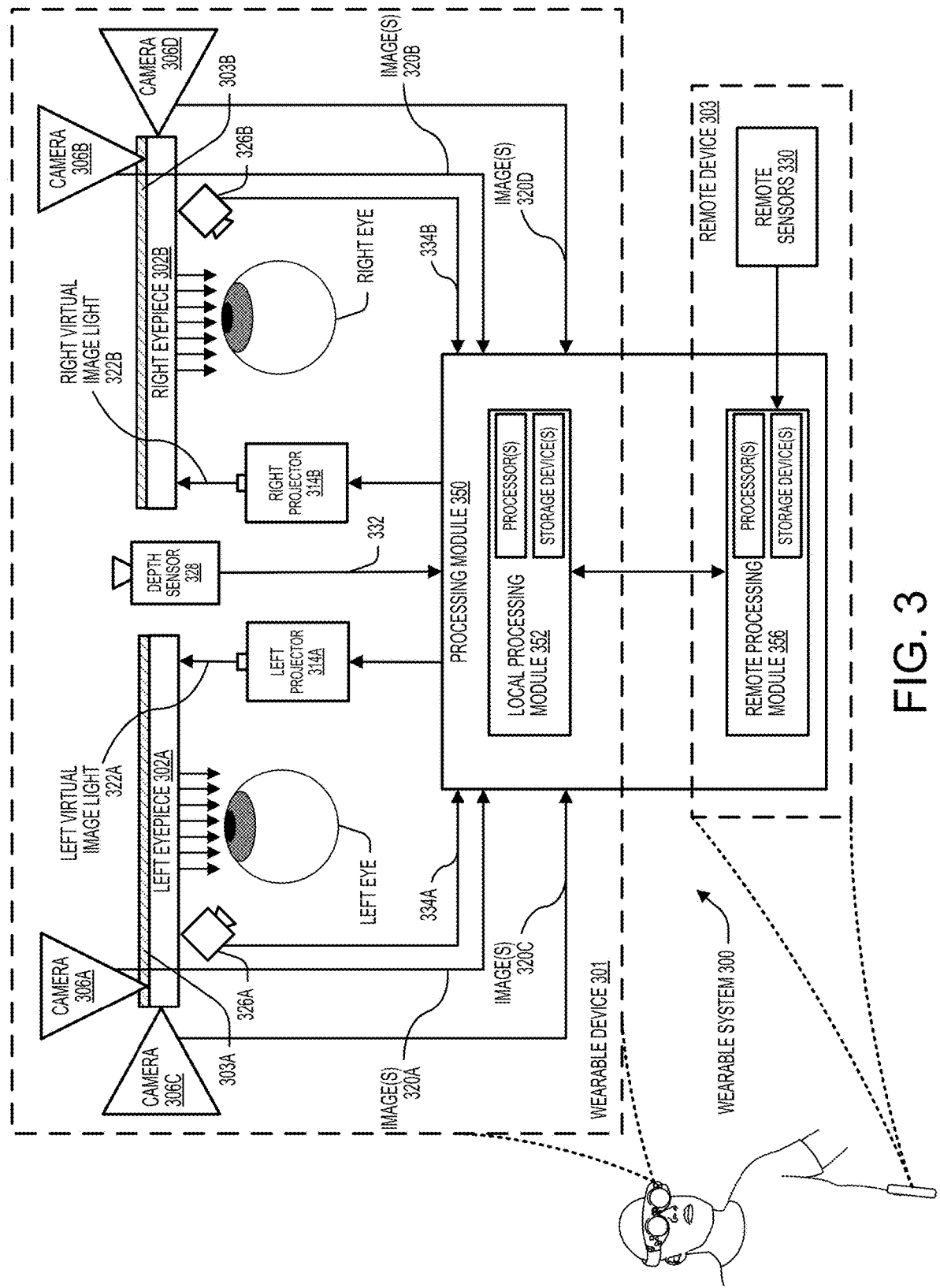
FIG. 3 illustrates a schematic view of an example wearable system.

FIG. 3 illustrates a schematic view of an example wearable system 300, according to some embodiments of the present disclosure. Wearable system 300 may include a wearable device 301 and at least one remote device 303 that is remote from wearable device 301 (e.g., separate hardware but communicatively coupled). Wearable device 301 as described in reference to FIG. 3 may correspond to AR device 200 as described above in reference to FIGS. 2A-2D. While wearable device 301 is worn by a user (generally as a headset), remote device 303 may be held by the user (e.g., as a handheld controller) or mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Wearable device 301 may include a left eyepiece 302A and a left dynamic dimmer 303A arranged in a side-by-side configuration and constituting a left optical stack. Similarly, wearable device 301 may include a right eyepiece 302B and a right dynamic dimmer 303B arranged in a side-by-side configuration and constituting a right optical stack. Each of the left and right optical stacks may further include various lenses, such as an accommodating lens on the user side of the optical stacks as well as a compensating lens on the world side of the optical stacks.

In some embodiments, wearable device 301 includes one or more sensors including, but not limited to: a left front-facing world camera 306A attached directly to or near left eyepiece 302A, a right front-facing world camera 306B attached directly to or near right eyepiece 302B, a left side-facing world camera 306C attached directly to or near left eyepiece 302A, a right side-facing world camera 306D attached directly to or near right eyepiece 302B, a left eye tracking camera 326A directed toward the left eye, a right eye tracking camera 326B directed toward the right eye, and a depth sensor 328 attached between eyepieces 302. Wearable device 301 may include one or more image projection devices such as a left projector 314A optically linked to left eyepiece 302A and a right projector 314B optically linked to right eyepiece 302B.

Wearable system 300 may include a processing module 350 for collecting, processing, and/or controlling data within the system. Components of processing module 350 may be distributed between wearable device 301 and remote device 303. For example, processing module 350 may include a local processing module 352 on the wearable portion of wearable system 300 and a remote processing module 356 physically separate from and communicatively linked to local processing module 352. Each of local processing module 352 and remote processing module 356 may include one or more processing units (e.g., central processing units (CPUs), graphics processing units (GPUs), etc.) and one or more storage devices, such as non-volatile memory (e.g., flash memory).

Processing module 350 may collect the data captured by various sensors of wearable system 300, such as cameras 306, eye tracking cameras 326, depth sensor 328, remote sensors 330, ambient light sensors, microphones, inertial measurement units (IMUs), accelerometers, compasses, Global Navigation Satellite System (GNSS) units, radio devices, and/or gyroscopes. For example, processing module 350 may receive image(s) 320 from cameras 306. Specifically, processing module 350 may receive left front image(s) 320A from left front-facing world camera 306A, right front image(s) 320B from right front-facing world camera 306B, left side image(s) 320C from left side-facing world camera 306C, and right side image(s) 320D from right side-facing world camera 306D. In some embodiments, image(s) 320 may include a single image, a pair of images, a video comprising a stream of images, a video comprising a stream of paired images, and the like. Image(s) 320 may be periodically generated and sent to processing module 350 while wearable system 300 is powered on, or may be generated in response to an instruction sent by processing module 350 to one or more of the cameras.

Cameras 306 may be configured in various positions and orientations along the outer surface of wearable device 301 so as to capture images of the user's surrounding. In some instances, cameras 306A, 306B may be positioned to capture images that substantially overlap with the field of views (FOVs) of a user's left and right eyes, respectively. Accordingly, placement of cameras 306 may be near a user's eyes but not so near as to obscure the user's FOV. Alternatively or additionally, cameras 306A, 306B may be positioned so as to align with the incoupling locations of virtual image light 322A, 322B, respectively. Cameras 306C, 306D may be positioned to capture images to the side of a user, e.g., in a user's peripheral vision or outside the user's peripheral vision. Image(s) 320C, 320D captured using cameras 306C, 306D need not necessarily overlap with image(s) 320A, 320B captured using cameras 306A, 306B.

In some embodiments, processing module 350 may receive ambient light information from an ambient light sensor. The ambient light information may indicate a brightness value or a range of spatially-resolved brightness values. Depth sensor 328 may capture a depth image 332 in a front-facing direction of wearable device 301. Each value of depth image 332 may correspond to a distance between depth sensor 328 and the nearest detected object in a particular direction. As another example, processing module 350 may receive eye tracking data 334 from eye tracking cameras 326, which may include images of the left and right eyes. As another example, processing module 350 may receive projected image brightness values from one or both of projectors 314. Remote sensors 330 located within remote device 303 may include any of the above-described sensors with similar functionality.

Virtual content is delivered to the user of wearable system 300 using projectors 314 and eyepieces 302, along with other components in the optical stacks. For instance, eyepieces 302A, 302B may comprise transparent or semi-transparent waveguides configured to direct and outcouple light generated by projectors 314A, 314B, respectively. Specifically, processing module 350 may cause left projector 314A to output left virtual image light 322A onto left eyepiece 302A, and may cause right projector 314B to output right virtual image light 322B onto right eyepiece 302B. In some embodiments, projectors 314 may include micro-electromechanical system (MEMS) spatial light modulator (SLM) scanning devices. In some embodiments, each of eyepieces 302A, 302B may comprise a plurality of waveguides corresponding to different colors. In some embodiments, lens assemblies 305A, 305B may be coupled to and/or integrated with eyepieces 302A, 302B. For example, lens assemblies 305A, 305B may be incorporated into a multi-layer eyepiece and may form one or more layers that make up one of eyepieces 302A, 302B.

Figure 4:
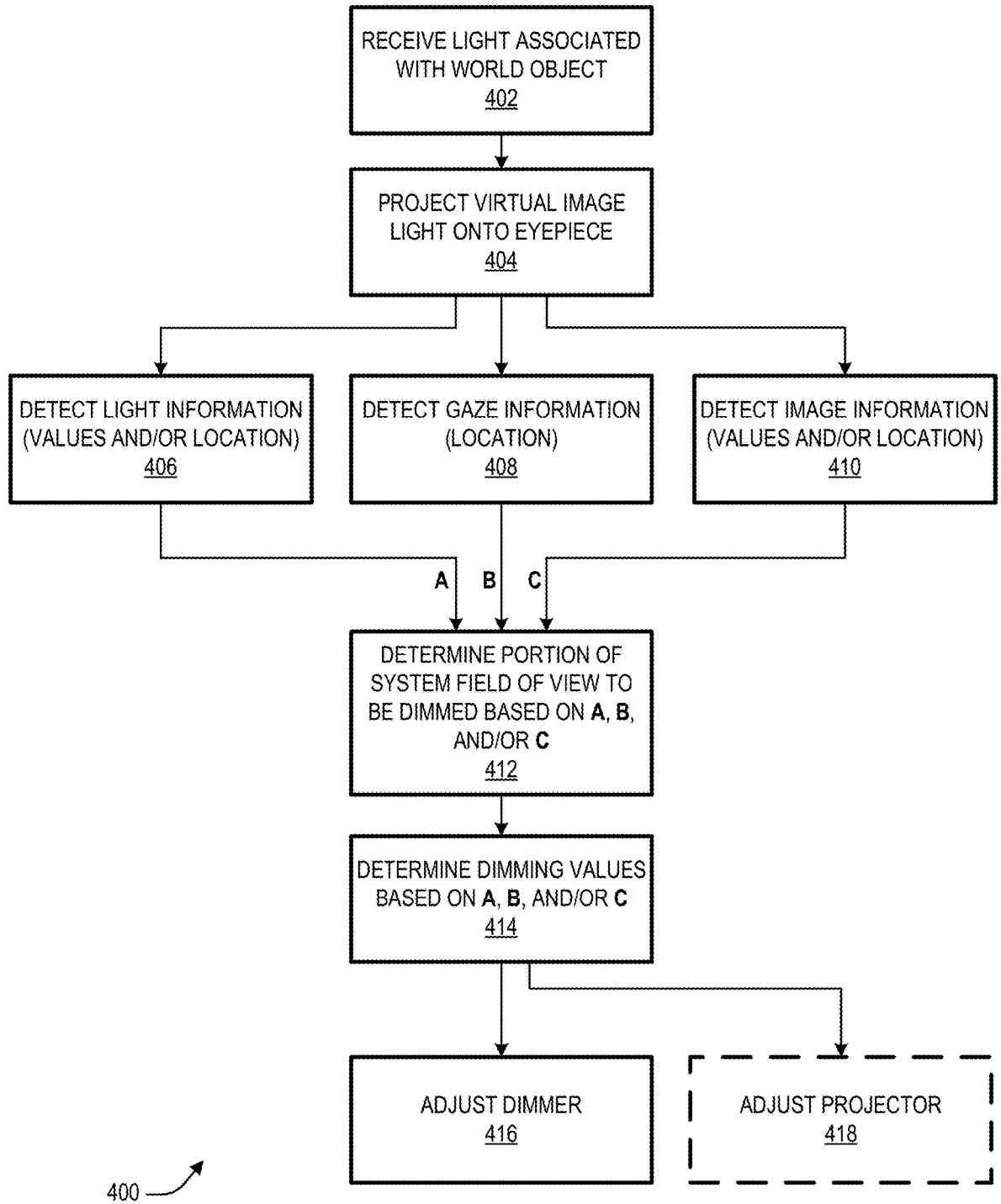
FIG. 4 illustrates a method for operating an optical system.

FIG. 4 illustrates an example method 400 for operating an optical system (e.g., AR device 200 or wearable system 300). Steps of method 400 may be performed in a different order than that shown in FIG. 4, and not all of the steps need be performed. For example, in some embodiments, one or more of steps 406, 408, and 410 may be omitted during performance of method 400. One or more steps of method 400 may be performed by a processor of processing module 350 or by some other component within wearable system 300.

At step 402, light (e.g., world light 232) associated with a world object (e.g., world objects 230) is received at the optical system. The world object may be any number of real-world objects, such as a tree, a person, a house, a building, the sun, etc., that is viewed by a user of the optical system. In some embodiments, the light associated with the world object is first received by a dynamic dimmer (e.g., dynamic dimmers 203 or 303) or by an external cosmetic lens of the optical system. In some embodiments, the light associated with the world object is considered to be received at the optical system when the light reaches one or more components of the optical system (e.g., when the light reaches the dynamic dimmer).

At step 404, virtual image light (e.g., virtual image light 222 or 322) is projected onto an eyepiece (e.g., eyepieces 202 or 302). The virtual image light may be projected onto the eyepiece by a projector (e.g., projectors 214 or 314) of the optical system. The virtual image light may correspond to a single image, a pair of images, a video comprising a stream of images, a video comprising a stream of paired images, and the like. In some embodiments, the virtual image light is considered to be projected onto the eyepiece when any light associated with the virtual image light reaches the eyepiece. In some embodiments, projecting the virtual image light onto the eyepiece causes a light field (i.e., an angular representation of virtual content) to be projected onto the user's retina in a manner such that the user perceives the corresponding virtual content as being positioned at some location within the user's environment.

During steps 406, 408, and 410, information may be detected by the optical system using, for example, one or more sensors of the optical system. At step 406, light information corresponding to the light associated with the world object is detected. The light information may be detected using a light sensor (e.g., ambient light sensor 234) mounted to the optical system. In some embodiments, the light information includes a plurality of spatially-resolved light values. Each of the plurality of spatially-resolved light values may correspond to a two-dimensional position within the system field of view. For example, each of the light values may be associated with a pixel of the dynamic dimmer. In other embodiments, or in the same embodiments, the light information may include a global light value. The global light value may be associated with the entire system field of view (e.g., an average light value of light impinging on all pixels of the dynamic dimmer).

At step 408, gaze information corresponding to an eye of a user of the optical system is detected. The gaze information may be detected using an eye tracker (e.g., eye trackers 240 or 326) mounted to the optical system. In some embodiments, the gaze information includes a gaze vector (e.g., gaze vector 238) of the eye of the user. In some embodiments, the gaze information includes one or more of a pupil position of the eye of the user, a center of rotation of the eye of the user, a pupil size of the eye of the user, a pupil diameter of the eye of the user, and cone and rod locations of the eye of the user. The gaze vector may be determined based on one or more components of the gaze information, such as the pupil position, the center of rotation of the eye, the pupil size, the pupil diameter, and/or the cone and rod locations. When the gaze vector is determined based on the cone and rod locations, it may further be determined based on the light information (e.g., the global light value) so as to determine an origin of the gaze vector within a retinal layer of the eye containing the cone and rod locations. In some embodiments, the gaze information includes a pixel or group of pixels of the dynamic dimmer at which the gaze vector intersects with the dynamic dimmer.

At step 410, image information corresponding to the virtual image light (e.g., virtual image light 222 or 322) projected by the projector onto the eyepiece is detected. The image information may be detected by the projector, by a processor (e.g., processing module 350), or by a separate light sensor. In some embodiments, the image information includes one or more locations within the dynamic dimmer through which the user perceives the virtual content when the user observes the virtual image light. In some embodiments, the image information includes a plurality of spatially-resolved image brightness values (e.g., brightness of the perceived virtual content). For example, each of the image brightness values may be associated with a pixel of the eyepiece or of the dynamic dimmer. In one particular implementation, when the processor sends instructions to the projector to project the virtual image light onto the eyepiece, the processor may determine, based on the instructions, the spatially-resolved image brightness values. In another particular implementation, when the projector receives the instructions from the processor to project the virtual image light onto the eyepiece, the projector sends the spatially-resolved image brightness values to the processor. In another particular implementation, a light sensor positioned on or near the eyepiece detects and sends the spatially-resolved image brightness values to the processor. In other embodiments, or in the same embodiments, the image information includes a global image brightness value. The global image brightness value may be associated with the entire system field of view (e.g., an average image brightness value of all of the virtual image light).

At step 412, a portion of the system field of view to be at least partially dimmed is determined based on the detected information. The detected information may include the light information detected during step 406, the gaze information detected during step 408, and/or the image information detected during step 410. In some embodiments, the portion of the system field of view is equal to the entire system field of view. In various embodiments, the portion of the system field of view may be equal to 1%, 5%, 10%, 25%, 50%, or 75%, etc., of the system field of view. In some embodiments, the different types of information may be weighted differently in determining the portion to be at least partially dimmed. For example, gaze information, when available, may be weighted more heavily in determining the portion to be at least partially dimmed than light information and image information. In one particular implementation, each type of information may independently be used to determine a different portion of the system field of view to be at least partially dimmed, and subsequently the different portions may be combined into a single portion using an AND or an OR operation.

In some embodiments, the information used to determine a portion of the system field of view to be at least partially dimmed includes information associated with one or more objects that are presented within the virtual content. For example, the virtual content may include text, navigational indicators (e.g., arrows), and/or other content. The portion of the field of view in which such content is to be presented, and/or the field of view proximal to the content, can be dimmed such that the user can more easily read perceive and understand the content, and distinguish the content from world object(s). The dimmer can selectively dim one or more pixels and/or zone(s) of pixels, or enhance viewing of the content. In one example, a section of the lower portion of the field of view can be selectively and dynamically dimmed to make is easier for the user to see directional (e.g., navigation) arrows, text messages, and so forth. Such dimming may be performed while the content is being displayed in response to a determination that such content is to be displayed, and the dimming may be removed when the content is no longer displayed. In some instances, the dimming may be performed to mitigate artifacts caused by the pixel structure that enables dimming over the entire field of view.

At step 414, a plurality of spatially-resolved dimming values for the portion of the system field of view are determined based on the detected information. In some embodiments, the dimming values are determined using a formulaic approach based on a desired opacity or visibility of the virtual content. In one particular implementation, the visibility of the virtual content may be calculated using the following equation:

$$V = \frac{I_{max}\left(1 - \frac{1}{C}\right)}{I_{max}\left(1 + \frac{1}{C}\right) + 2I_{back}}$$

where V is the visibility, $I_{max}$ is the brightness of the virtual image light as indicated by the image information, $I_{back}$ is related to a light value associated with the world object as indicated by the light information (which may be modified by the determined dimming value), and C is a desired contrast (e.g., 100:1). For example, the visibility equation may be used at each pixel location of the dimmer to calculate a dimming value for the particular pixel location using the brightness of the virtual image light at the particular pixel location and the light value associated with the world object at the particular pixel location. In some embodiments, $I_{back}$ may be defined using the following equation:

$$I_{back} = T_v * I_{world}$$

where $T_v$ is the percentage of light that is allowed to pass through one or more pixels of the dimmer, and $I_{world}$ is the brightness of ambient light from the world as indicated by the light information. In some examples, $T_v$ may be representative of or related to a dimming value.

At step 416, the dimmer is adjusted to reduce an intensity of the light associated with the object in the portion of the system field of view. For example, the dimmer may be adjusted such that the intensity of the light associated with the object impinging on each pixel location of the dimmer is reduced according to the dimming value determined for that particular pixel location. As used in the present disclosure, adjusting the dimmer may include initializing the dimmer, activating the dimmer, powering on the dimmer, modifying or changing a previously initialized, activated, and/or powered on dimmer, and the like. In some embodiments, the processor may send data to the dimmer indicating both the portion of the system field of view and the plurality of spatially-resolved dimming values.

At step 418, the projector is adjusted to adjust a brightness associated with the virtual image light. For example, in some embodiments it may be difficult to achieve a desired opacity or visibility of the virtual content without increasing or decreasing the brightness of the virtual object. In such embodiments, the brightness of the virtual image light may be adjusted before, after, simultaneously, or concurrently with adjusting the dimmer.

Figure 5:
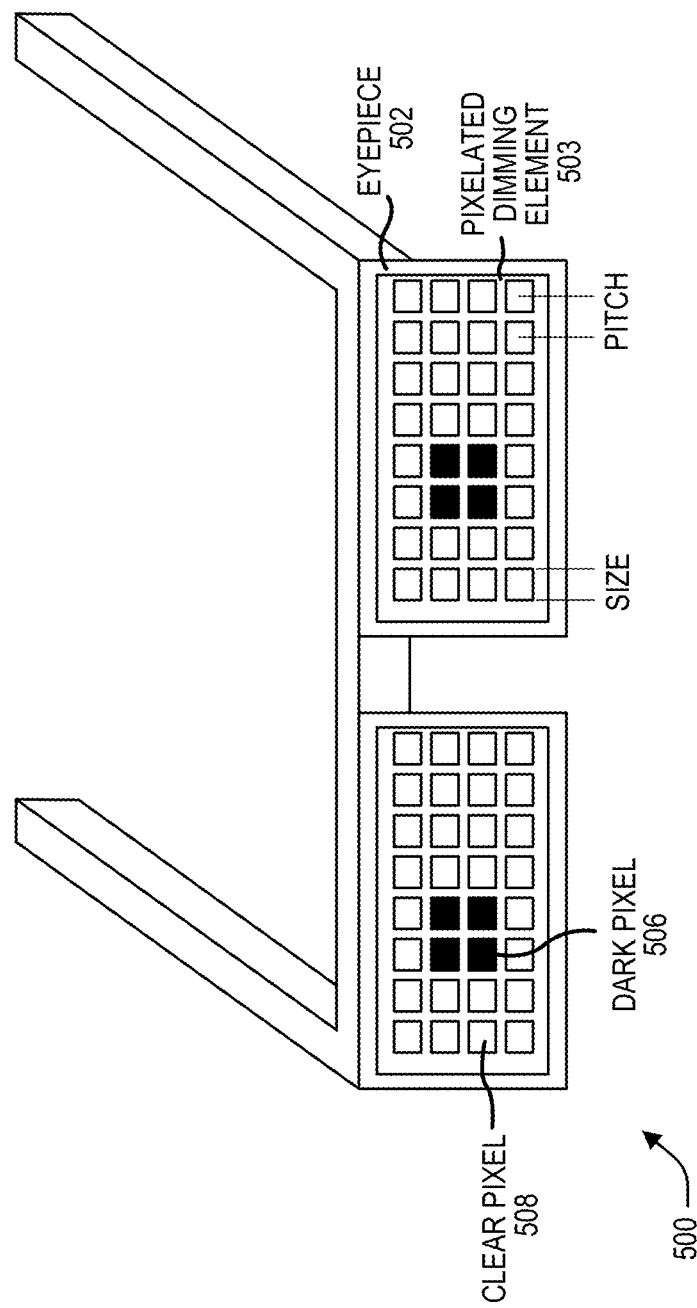
FIG. 5 illustrates an AR device with an eyepiece and a pixelated dimming element.

FIG. 5 illustrates an AR device 500 with an eyepiece 502 and a pixelated dimming element 503 consisting of a spatial grid of dimming areas (i.e., pixels) that can have various levels of dimming. Each of the dimming areas may have an associated size (i.e., width) and an associated spacing (i.e., pitch). As illustrated, the spatial grid of dimming areas may include one or more dark pixels 506 providing complete dimming of incident light and one or more clear pixels 508 providing complete transmission of incident light. Adjacent pixels within pixelated dimming element 503 may be bordering (e.g., when the pitch is equal to the size) or may be separated by gaps (e.g., when the pitch is greater than the size). In various embodiments, pixelated dimming element 503 may employ liquid crystal technology such as dye doped or guest host liquid crystals, twisted nematic (TN) or vertically aligned (VA) liquid crystals, or ferroelectric liquid crystals. In some embodiments, pixelated dimming element 503 may comprise an electrochromic device, among other possibilities. In some implementations, pixelated dimming element 503 may employ electrically controlled birefringence ("ECB") technology, such as an ECB cell.

Figure 6:
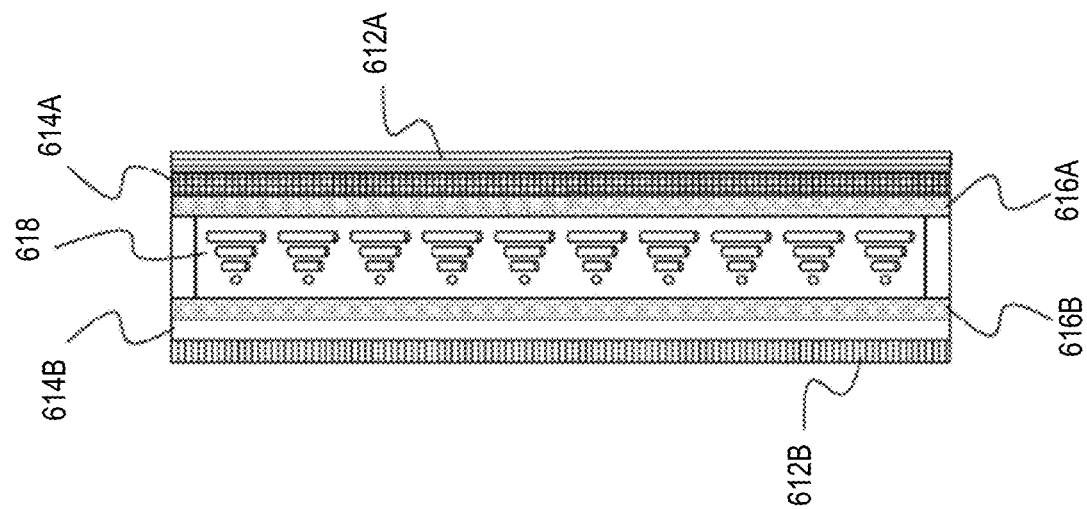
FIG. 6 illustrates a side view of a controllable dimming assembly.
Figure 6:
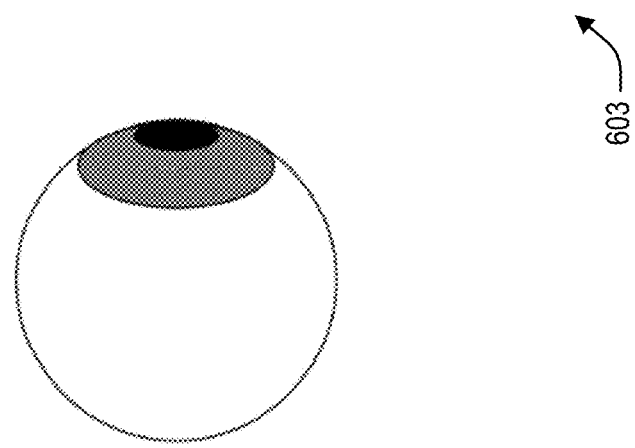

FIG. 6 illustrates a side view of a controllable dimming assembly 603, according to some embodiments of the present disclosure. Controllable dimming assembly 603 may form all or part of an external cover of an AR system and/or may be integrated within an optical stack of an AR system. In some implementations, controllable dimming assembly 603 of FIG. 6 may correspond to one or more of components 203, 303A, 303B, and 503 as described above with reference to FIGS. 2A-2C, 3, and 5. In the example of FIG. 6, controllable dimming assembly 603 includes a liquid crystal layer 618 sandwiched between an outer electrode layer 616A and an inner electrode layer 616B, which are in turn sandwiched between an outer polarizer 612A and an inner polarizer 612B. In some examples, controllable dimming assembly 603 may further include an outer compensation film layer 614A (or waveplate) positioned between outer polarizer 612A and outer electrode layer 616A, an inner compensation film layer 614B (or waveplate) positioned between inner polarizer 612B and inner electrode layer 616B, or both. Additional examples of controllable dimming assembly architectures and control schemes are described in further detail in U.S. Provisional Patent Application Ser. No.

62/725,993, U.S. Provisional Patent Application Ser. No. 62/731,755, and U.S. Provisional Patent Application Ser. No. 62/858,252, all of which are incorporated herein by reference in their entirety.

In operation, outer polarizer 612A may impart a first polarization state (e.g., vertical polarization) to ambient light propagating therethrough toward a user's eye. Next, liquid crystal molecules contained within liquid crystal layer 618 may further rotate/polarize the polarized ambient light in accordance with one or more electric fields applied across outer and inner electrode layers 616A, 616B. It follows that the polarization rotation imparted by the pair of electrode layers 616A, 616B and liquid crystal layer 618 may serve to effectively alter the polarization state of ambient light passing therethrough. In some examples, retardation and/or additional polarization rotation may be imparted by way of outer and/or inner compensation film layers 614A, 614B. Lastly, inner polarizer 612B may impart a second, different polarization state (e.g., horizontal polarization) to ambient light propagating therethrough toward a user's eye. The second polarization state may be configured to be nearly orthogonal to the cumulative polarization state imparted on the ambient light by the combined effects of outer polarizer 612A, liquid crystal layer 618, and optionally outer and/or inner compensation film layers 614A, 614B. Accordingly, inner polarizer 612B may allow portions of ambient light in the second polarization state to pass therethrough unaffected, and may attenuate portions of ambient light in polarization states other than the second polarization state.

In some implementations, controllable dimming assembly 603 of FIG. 6 may be configured to generate a segmented or pixelated tinting/dimming pattern to attenuate ambient light incident thereon. In such implementations, one of outer electrode layer 616A and inner electrode layer 616B may correspond to a layer of individually-addressable electrodes arranged in a two-dimensional array. For instance, in some examples, outer electrode layer 616A may correspond to an array of electrodes that may each be selectively controlled by controllable dimming assembly 603 to generate a respective electric field/voltage in tandem with outer electrode layer 616B, which may correspond to a single planar electrode. Controllable dimming assembly 603 of FIG. 6 may be configured to generate a dimming pattern upon application of one or more electric fields/voltages across outer and inner electrode layers 616A, 616B. In some examples, the electrodes of one or both of outer and inner electrode layers 616A, 616B may be made out of an optically-transmissive conducting material, such as indium tin oxide (ITO).

In some examples, controllable dimming assembly 603 may be configured to attenuate ambient light passing therethrough in accordance with a gradient tinting/dimming pattern by way of at least one component thereof (e.g., outer polarizer 612A, inner polarizer 612B, outer compensation film layer 614A, inner compensation film layer 614B, outer electrode layer 616A, inner electrode layer 616B, circuitry electrically coupled to outer electrode layer 616A and/or inner electrode layer 616B, substrate material disposed adjacent liquid crystal layer 618, outer electrode layer 616A, and/or inner electrode layer 616B, etc.) that is configured to impart polarization states that vary on the basis of the location and/or angle at which the ambient light is incident such a component. In some implementations in which controllable dimming assembly 603 includes at least one compensation film layer (e.g., one or both of outer and inner compensation film layers 614A, 614B), such a compensation film layer 614A, 614B may be configured so as to polarize/rotate/retard ambient light passing therethrough in a manner varying on the basis of the location and/or angle at which the ambient light is incident compensation film layer 614A, 614B. An angle attenuation component may be arranged on at least a portion of a surface of eyepiece(s) of the display system. For example, in some implementations, the angle attenuation component may be arranged adjacent to a controllable dimming assembly of a display system, such as one or more of components 203, 303a, 303B, 503, and 603 as described herein with reference to FIGS. 2A-2C, 3, 5, and 6.

When viewing the real world through an optically-transmissive spatial light modulator or display with an array of pixels, such as an optically-transmissive controllable dimming assembly, an optically-transmissive LCD, and/or an optically-transmissive OLED display, one may see spikes or streaks emanating from various light sources in the real world. More specifically, the array of pixels in an optically-transmissive spatial light modulator or display may interact with light in a manner similar to that of a "cross screen" or a "star" photographic filter by virtue of its geometry, such that a distinct number of diffraction spikes are produced around light sources in the real world.

Figure 7C:
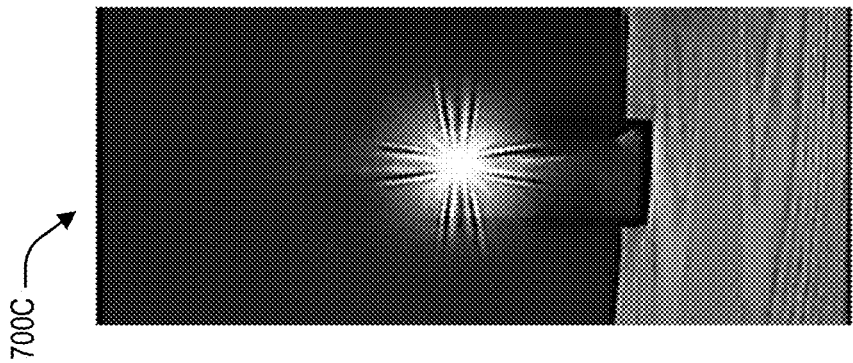
FIGS. 7A-7C illustrate example images of a scene as captured using various techniques.
Figure 7B:
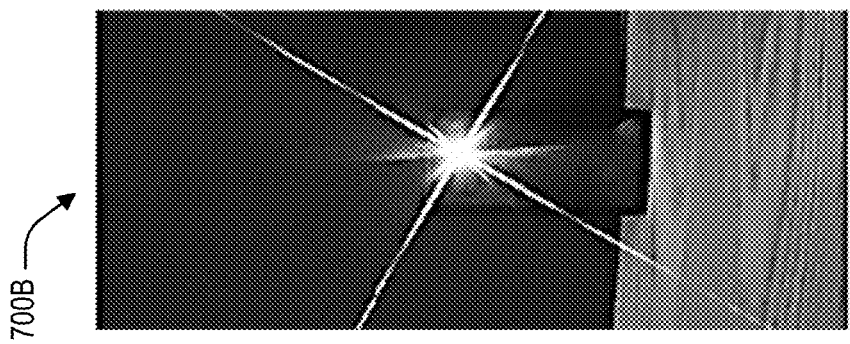
Figure 7A:
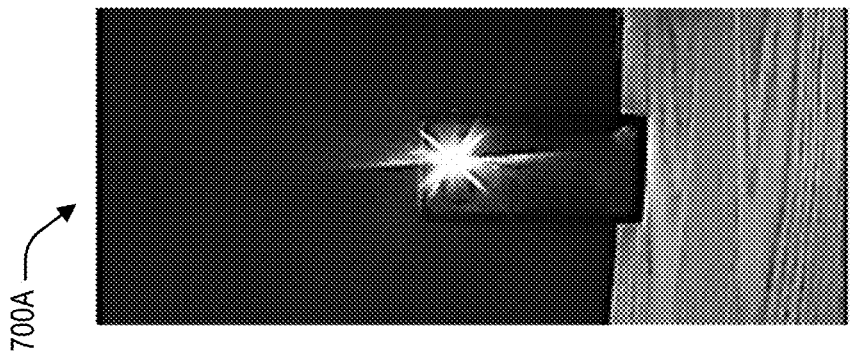

FIGS. 7A-7C illustrate example images 700 of a scene as captured using various techniques, according to some embodiments of the present disclosure. FIG. 7A illustrates an example image 700A of a scene as captured by a camera. FIG. 7B illustrates an example image 700B of the same scene as captured by the same camera through an optically-transmissive spatial light modulator with an array of pixels. The optically-transmissive spatial light modulator through which example image 700B was captured is described in further detail below with reference to FIGS. 8A and 8B. The scene captured in both of example images 700A and 700B features an illuminated light source (e.g., a light on a mobile phone). However, it can be seen that a distinct number of diffraction spikes (e.g., four diffraction spikes) are present around the light source in example image 700B that are not present in example image 700A. While the optical effect exhibited in example 700B may be desirable in certain applications (e.g., artistic photography, etc.), through developing the systems and techniques described herein, it has been found that such an effect can sometimes be seen as an annoyance or a distraction to users of see-through display systems. As such, in some examples, it may be desirable to reduce the noticeability of diffraction spikes produced by optically-transmissive spatial light modulators or displays in see-through display systems.

In some implementations, the noticeability of diffraction spikes produced in see-through display systems may be reduced by employing an optically-transmissive spatial light modulator or display, such as an optically-transmissive controllable dimming assembly, that is configured to produce a relatively high number of diffraction spikes per light source. While this may appear to be counterintuitive, the number of diffraction spikes or streaks that are produced per light source may be inversely proportional to the intensity and/or length of each streak. For example, FIG. 7C shows an example image 700C of the same scene as shown in FIGS. 7A and 7B and as captured by the same camera through an optically-transmissive spatial light modulator configured to produce a relatively high number of diffraction spikes per light source. The optically-transmissive spatial light modulator through which example image 700C was captured is described in further detail below with reference to FIGS. 9A-9B.

It can be seen that a greater number of diffraction spikes are present around the light source in example image 700C than are present around the light source in example image 700B. However, given the inverse relationship between the number of diffraction spikes or streaks produced per light source and the intensity and/or length of each streak, the diffraction spikes in example image 700C are less defined and are shorter than the diffraction spikes in example image 700B. Furthermore, the diffraction spikes or streaks exhibited around the light source in example image 700C appear to be much more condensed or localized than those exhibited around the light source in example image 700B, which are relatively far-reaching. Through developing the systems and techniques described herein, it has been found that many users of see-through display systems consider the optical effect exhibited in example image 700C to be less of an annoyance and/or a distraction than the optical effect exhibited in example image 700B. As such, in some implementations, an optically-transmissive spatial light modulator or display of a see-through display system may be configured to produce a relatively high number of diffraction spikes per light source so as to provide enhanced user experience.

The number of diffraction spikes or streaks that are produced around a given light source in the real world is proportional to the number of sides or edges of the aperture through which light from said given light source passes, which may also correspond to the number of sides or edges of the diaphragm that surrounds and/or defines the aperture through which light from said given light source passes. The pattern of diffraction spikes or streaks produced around a given light source in the real world corresponds to the Fourier Transform of the geometry of the aperture-diaphragm with which light from said given light source interacts. As such, an aperture-diaphragm geometry with n edges may yield n diffraction spikes or streaks if n is even, and may yield 2n diffraction spikes or streaks if n is odd. This also means that the angular orientation of a given edge of an aperture-diaphragm geometry may at least in part dictate the angular orientation of the diffraction spike or streak that it yields. Through developing the systems and techniques described herein, it has been found that each pixel in an array of pixels in an optically-transmissive spatial light modulator or display can act as a sort of aperture through which light from the real world passes, and that the components that surround each pixel (e.g., conductors, circuitry, light-blocking masks or matrices, etc.) in the array can act as a sort of corresponding diaphragm.

Figure 8B:
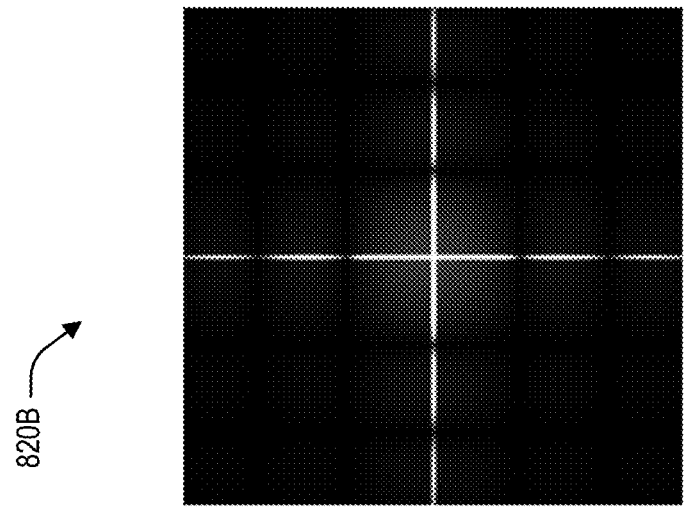
FIGS. 8A and 8B illustrate an example array of pixels and a corresponding point spread function, respectively.
Figure 8A:
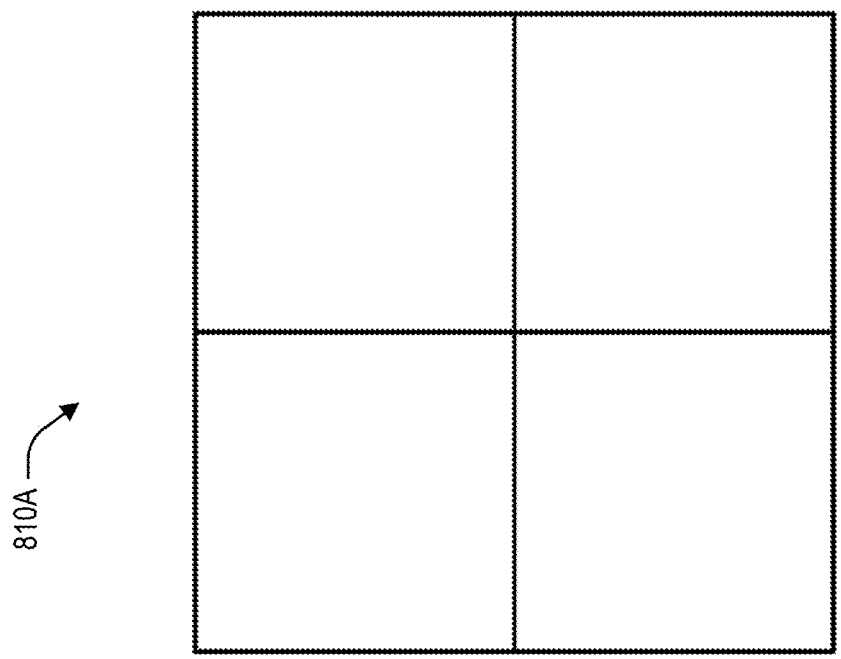

FIGS. 8A and 8B illustrate an example array of pixels 810A and a corresponding point spread function (PSF) 820B, respectively, according to some embodiments of the present disclosure. Given that pixels are most often square or rectangular in shape, which are quadrilaterals (i.e., four-sided shapes), it follows that many optically-transmissive spatial light modulators and displays may produce four diffraction spikes around each real world light source, as was the case in the example of FIG. 7B. For example, FIG. 8A depicts array of pixels 810A with such geometry, and FIG. 8B depicts PSF 820B associated therewith. PSF 820B may, for example, correspond to the Fourier Transform of example pixel array 810A. As shown in FIG. 8B, PSF 820B features four distinct spikes or streaks that are not unlike those exhibited in example image 700B of FIG. 7B.

Figure 9B:
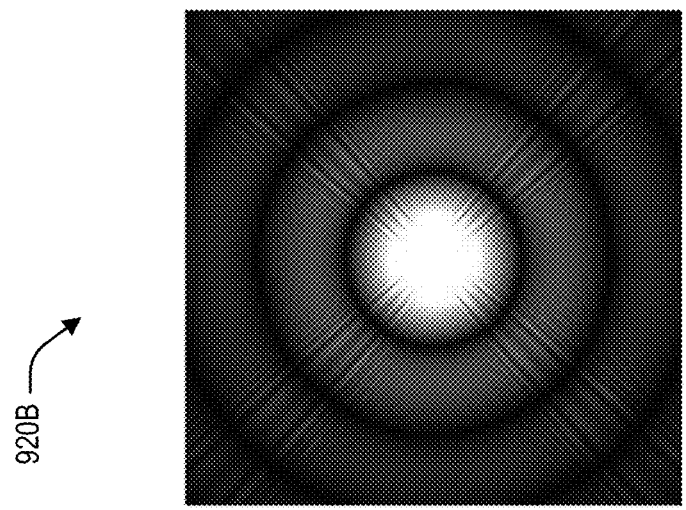
FIGS. 9A and 9B illustrate an example array of pixels and a corresponding PSF, respectively.
Figure 9A:
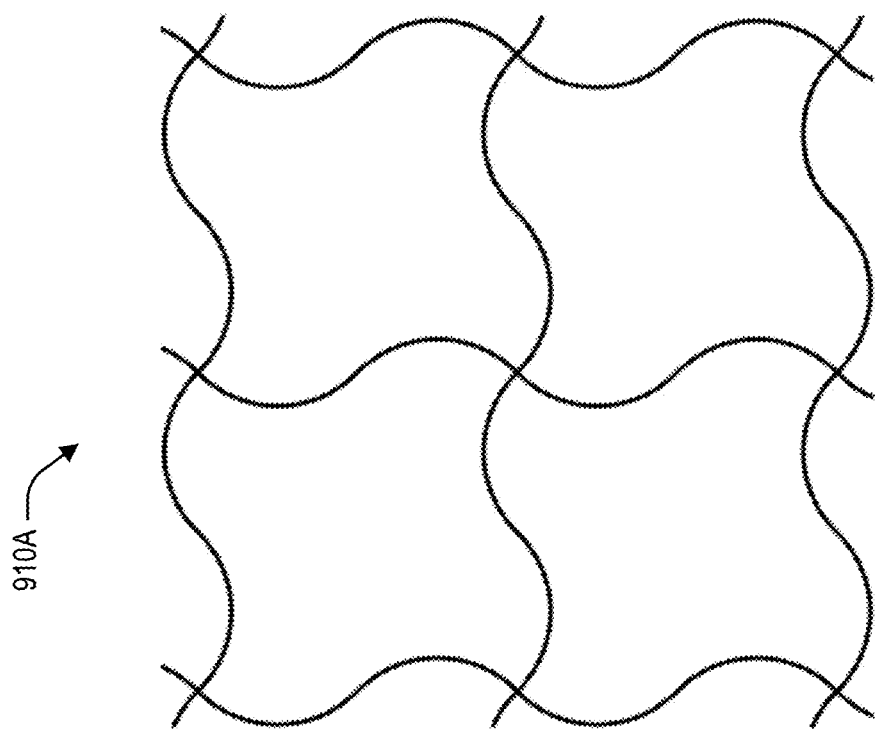

FIGS. 9A and 9B illustrate an example array of pixels 910A and a corresponding PSF 920B, respectively, according to some embodiments of the present disclosure. In some implementations, the relationship between aperture-diaphragm geometry and diffraction spike patterning may be leveraged in one or more of the systems and techniques described herein so as to produce an increased number of diffraction spikes per light source and thus enhance user experience. For example, FIG. 9A depicts array of pixels 910A according to some of such implementations, and FIG. 9B depicts PSF 920B associated therewith. PSF 920B may, for example, correspond to the Fourier Transform of pixel array 910A.

As shown in FIG. 9A, each pixel in array of pixels 910A has a curved geometry. More specifically, each pixel in array of pixels 910A is bounded by a series of arcs, semicircles, or serpentine segments. In some implementations, the curved geometry of each pixel in array of pixels 910A is approximated by many straight line segments. Each pixel better approximates a curved geometry the more straight line segments that can be utilized in forming the pixel. In some implementations, each curved side of the pixel may be formed using 50, 100, 500, or 1000 straight line segments, among other possibilities. As such, as used herein, a side of a pixel or electrode that is comprised of multiple straight lines that in the aggregate have the appearance of a curved side when the side is viewed in its entirety is considered to be "curved". Such a side may be partially curved (e.g., only a portion of the side has the appearance of being curved when the side is viewed in its entirety) or completely curved (e.g., each and every portion of the side has the appearance of being curved when the side is viewed in its entirety).

The aperture-diaphragm geometry associated with each pixel in array of pixels 910A can be said to have an infinite or near infinite number of edges. Furthermore, as shown in FIG. 9B, the pattern exhibited in PSF 920B, which is not unlike the diffraction pattern exhibited in image 700C of FIG. 7C, features an indistinguishable (presumably near infinite) number of spikes or streaks and bears a relatively strong resemblance to an Airy pattern. In addition, because a relatively large range of different angular components are represented in the geometry associated with array of pixels 910A, and further because the distribution of such different angular components represented in the geometry associated with array of pixels 910A is relatively uniform, the pattern exhibited in PSF 920B features diffraction spikes or streaks that radiate or emanate from the origin at a large range of different angles and in a manner such that individual spikes or streaks stand out less.

Notably, it can be seen that the change in intensity as a function of distance from the center or origin is much more rapid in PSF 920B than in PSF 820B. Indeed, by employing curved geometries in arrays of pixels, an advantageous diffraction pattern may be achieved. As described in further detail below, advantageous diffraction patterns may be achieved in a see-through display system with an optically-transmissive spatial light modulator and display by employing curved geometries in pixel components (e.g., electrodes) and/or one or more of components that surround pixel components (e.g., conductors, circuitry, light-blocking masks or matrices, etc.) of the optically-transmissive spatial light modulator or display.

Figure 10:
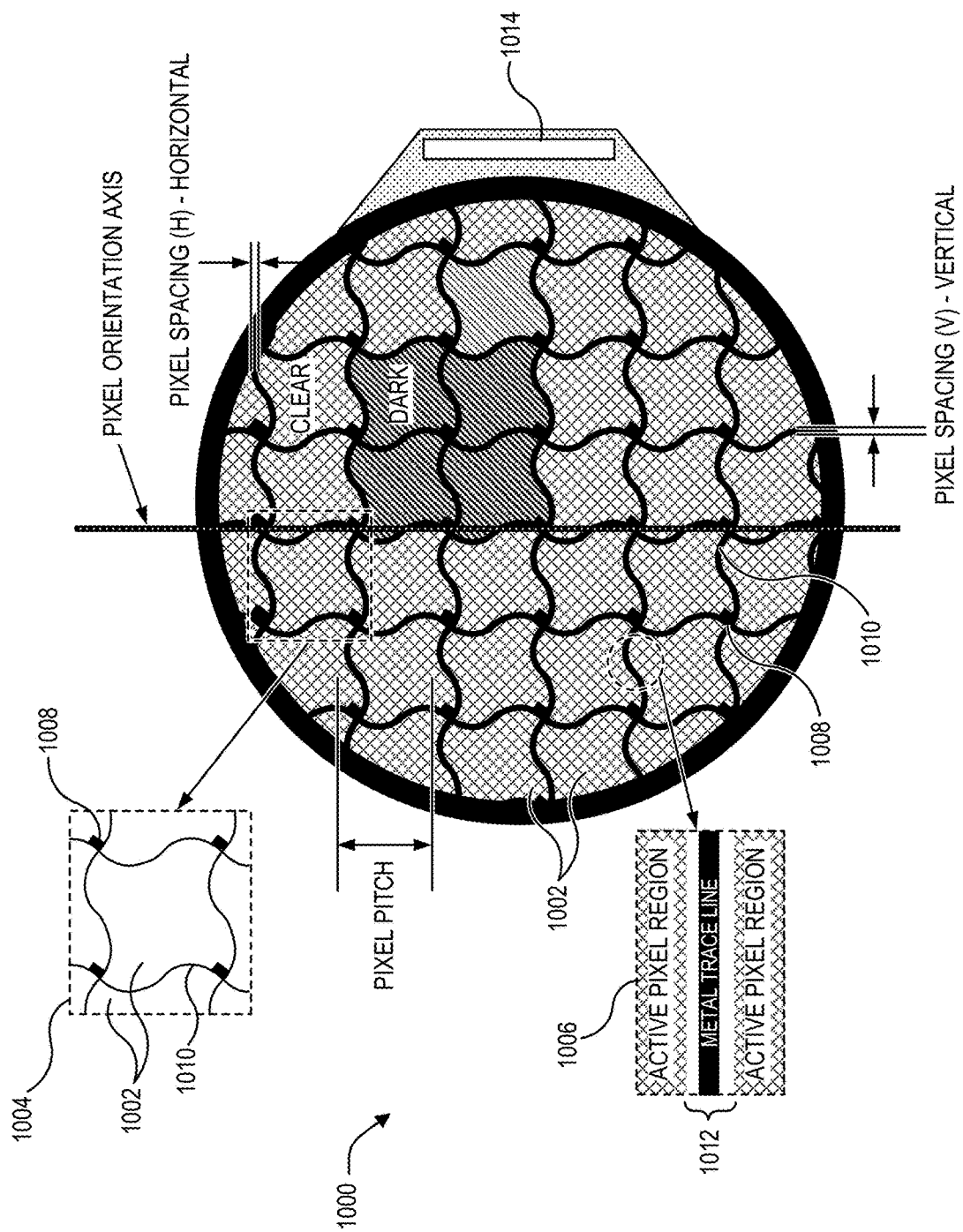
FIG. 10 depicts an example optically-transmissive spatial light modulator or display for a see-through display system.

FIG. 10 depicts an example optically-transmissive spatial light modulator or display 1000 for a see-through display system, according to some embodiments of the present disclosure. The optically-transmissive spatial light modulator or display 1000 may, for example, correspond to an optically-transmissive controllable dimming assembly that is similar or equivalent to one or more of the dimming assemblies described herein, an optically-transmissive LCD, an optically-transmissive OLED display, and the like. As shown in FIG. 10, optically-transmissive spatial light modulator or display 1000 includes an array of pixels 1002, each of which has a curved geometry (as shown by inset 1004) and is spaced apart from one or more neighboring pixels (as shown by inset 1006).

Each pixel in array of pixels 1002 of optically-transmissive spatial light modulator or display 1000 is also electrically coupled to a corresponding thin film transistor (TFT) 1008, which in turn is electrically coupled to a corresponding pair of metal line traces or conductors 1010. Such metal line traces or conductors 1010 are positioned in transmissive gap regions 1012 between pixels, and are further electrically coupled to one or more circuits for controlling the state of each pixel of the example optically-transmissive spatial light modulator or display 1000. In the example of FIG. 10, such one or more circuits may include a chip on glass (COG) 1014 laterally offset from array of pixels 1002. In this way, COG 1014 of optically-transmissive spatial light modulator or display 1000 may be positioned outside of a user's FOV, obscured by housing or other components of the see-through display system, or a combination thereof.

Figure 11:
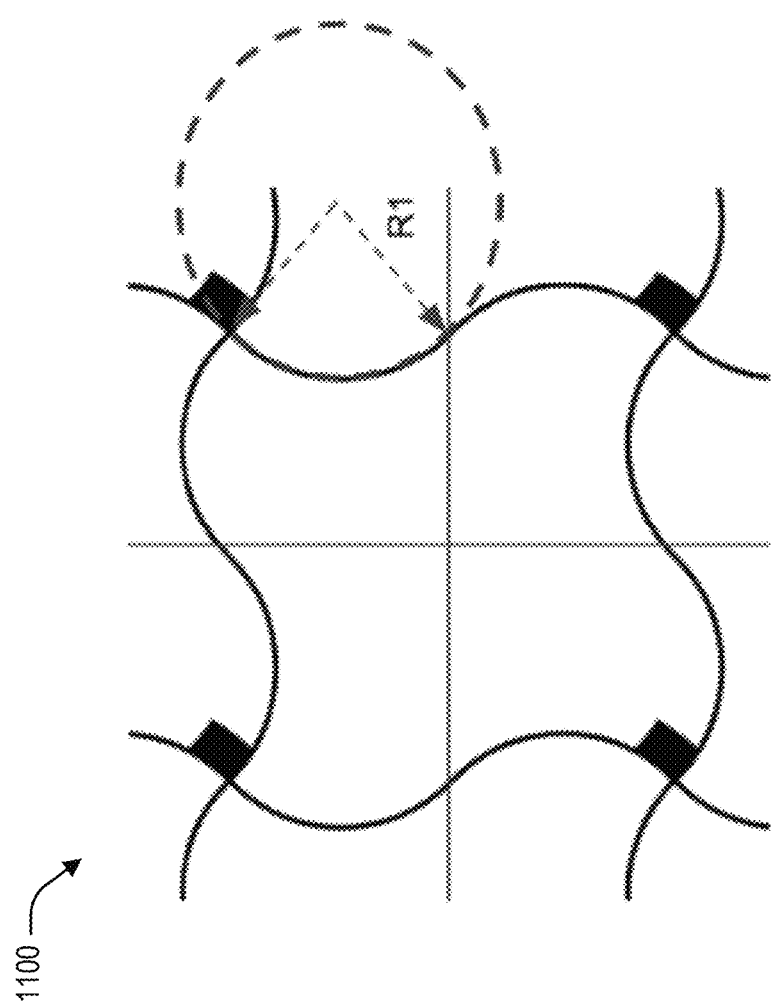
FIG. 11 depicts an example curved geometry.

FIG. 11 depicts an example curved geometry 1100, according to some embodiments of the present disclosure. Curved geometry 1100 includes a "quarter circle" curvature design in which a radius R1 of curvature is used, which may be defined as R1=pixel pitch(p)×√2/4. In one example, p=500 μm and R1=176.7 μm. In some implementations, the example curved geometry 1100 of FIG. 11 may be employed in optically-transmissive spatial light modulator or display 1000 of FIG. 10 or other similar system.

Figure 12A:
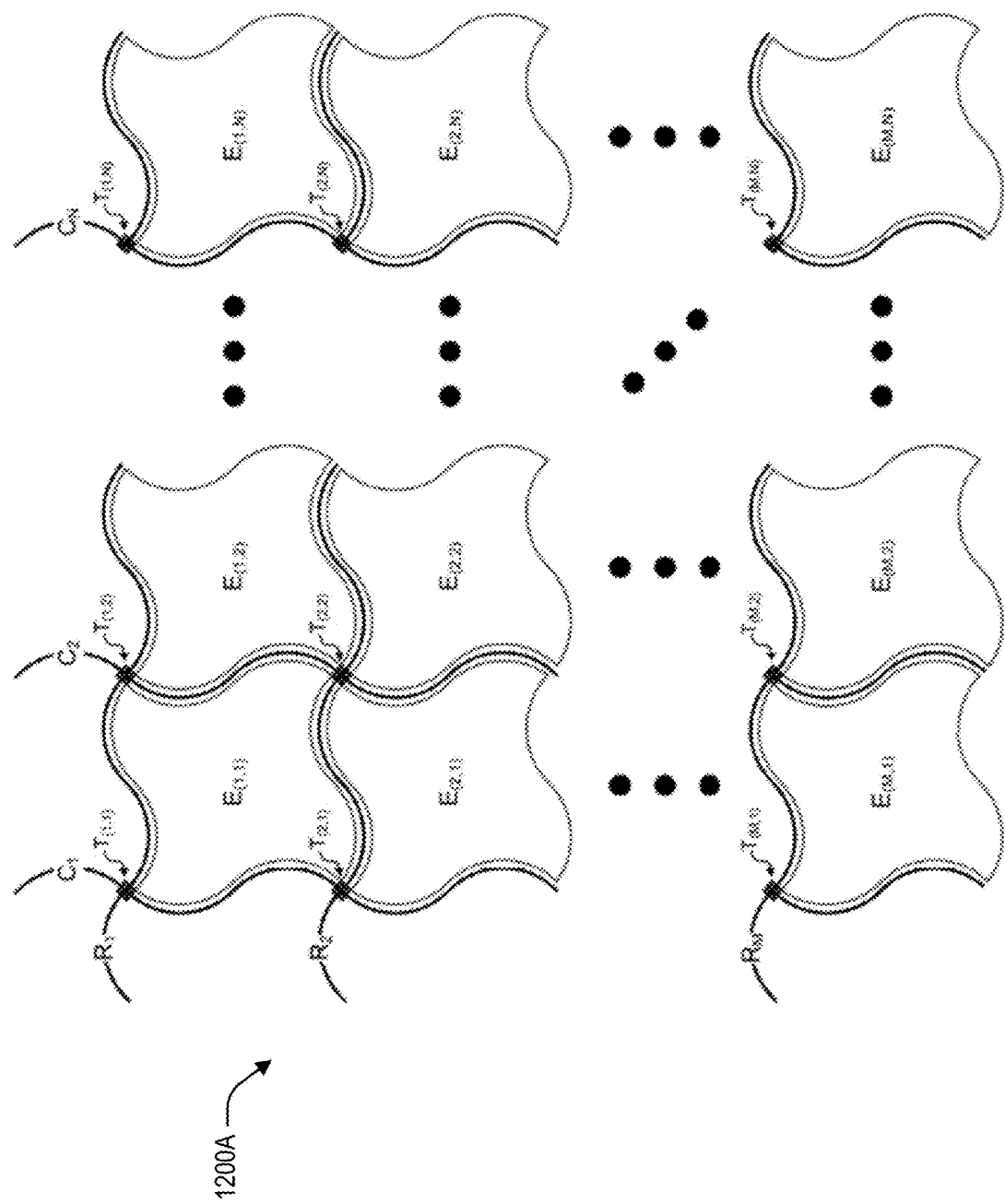
FIG. 12A depicts an example pixel layout including pixel electrodes, circuit modules, and conductors.

FIG. 12A depicts an example pixel layout 1200A including pixel electrodes $E_{(1,1)}$ to $E_{(M,N)}$, circuit modules $T_{(1,1)}$ to $T_{(M,N)}$, and conductors $R_1$ to $R_M$ and $C_1$ to $C_N$, according to some embodiments of the present disclosure. More specifically, in the example of FIG. 12A, pixel layout 1200A includes pixel electrodes $E_{(1,1)}$ to $E_{(M,N)}$ arranged in an array with N rows and M columns. In some examples, pixel electrodes $E_{(1,1)}$ to $E_{(M,N)}$ may be made out of an optically-transmissive conductive material, such as ITO. Each one of pixel electrodes $E_{(1,1)}$ to $E_{(M,N)}$ is electrically coupled to a corresponding one of circuit modules $T_{(1,1)}$ to $T_{(M,N)}$. In some implementations, pixel electrodes $E_{(1,1)}$ to $E_{(M,N)}$ may correspond to a pixel array similar or equivalent to array of pixels 1002 described above with reference to FIG. 10. In some implementations, each one of circuit modules $T_{(1,1)}$ to $T_{(M,N)}$ may correspond to a TFT circuit similar or equivalent to TFTs 1008 described above with reference to FIG. 10. In some examples, each TFT circuit may include one or more electronic components in addition to the thin-film transistor.

Each one of circuit modules $T_{(1,1)}$ to $T_{(M,N)}$ is in turn electrically coupled to a corresponding one of conductors $R_1$ to $R_M$, and to a corresponding one of conductors $C_1$ to $C_N$. In some examples, conductors $R_1$ to $R_M$ and $C_1$ to $C_N$ may correspond to metal trace lines or conductors 1010 described above with reference to FIG. 10. Conductors $R_1$ to $R_M$ and $C_1$ to $C_N$ may be electrically coupled to circuitry configured to drive or otherwise control operation of the spatial light modulator or display to which example pixel layout 1200A corresponds. In some examples, such circuitry may correspond to COG 1014 described above with reference to FIG. 10. As shown in FIG. 12A, pixel electrodes $E_{(1,1)}$ to $E_{(M,N)}$ and conductors $R_1$ to $R_M$ and $C_1$ to $C_N$ adhere to a particular curved geometry similar to that which is depicted in FIGS. 9A, 10, and 11.

Figure 12B:
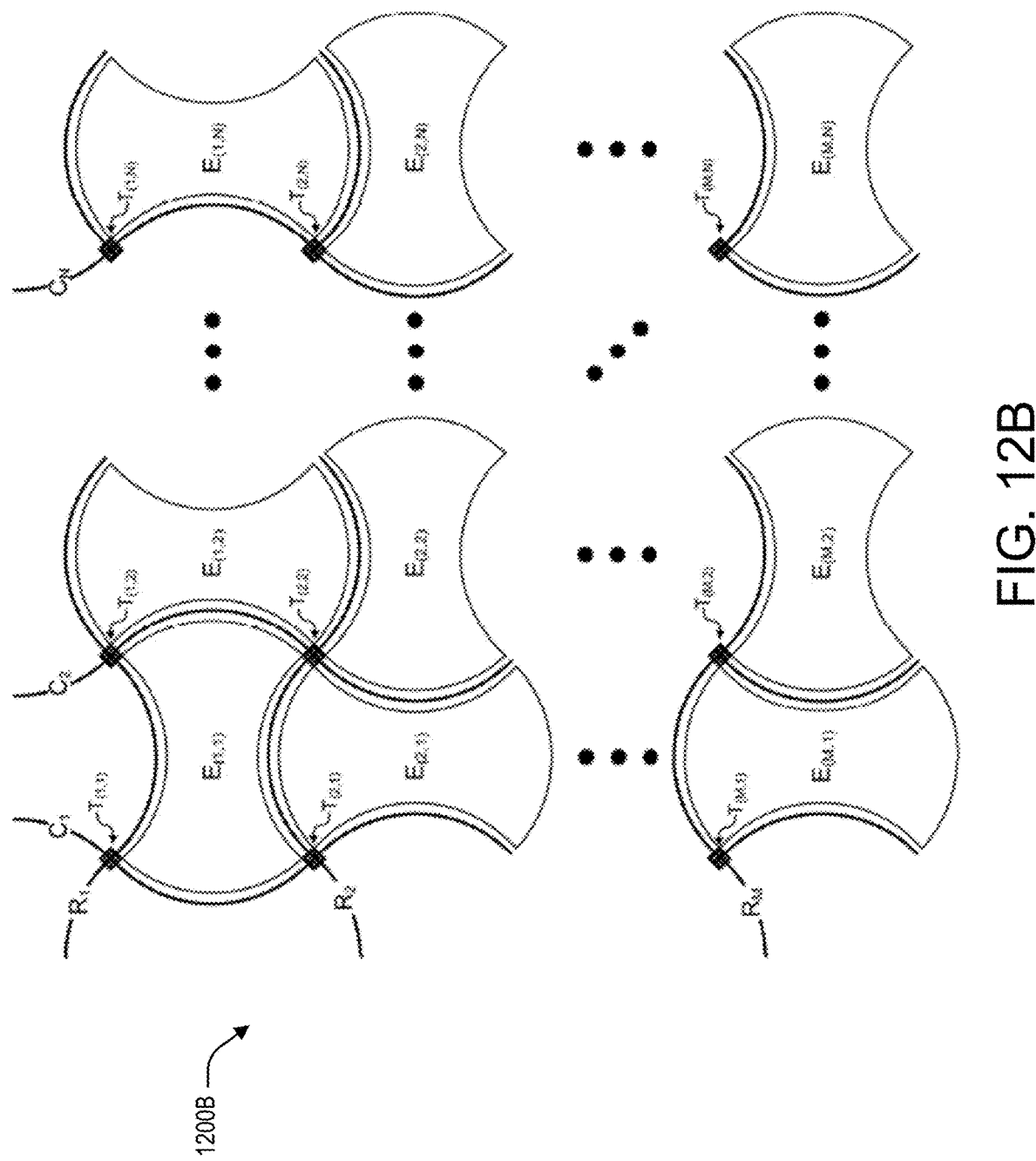
FIG. 12B depicts an example pixel layout including pixel electrodes, circuit modules, and conductors.

FIG. 12B depicts an example pixel layout 1200B including pixel electrodes $E_{(1,1)}$ to $E_{(M,N)}$, circuit modules $T_{(1,1)}$ to $T_{(M,N)}$, and conductors $R_1$ to $R_M$ and $C_1$ to $C_N$, according to some embodiments of the present disclosure. In some examples, pixel electrodes $E_{(1,1)}$ to $E_{(M,N)}$, circuit modules $T_{(1,1)}$ to $T_{(M,N)}$, and conductors $R_1$ to $R_M$ and $C_1$ to $C_N$ of pixel layout 1200B may be functionally similar or equivalent to pixel electrodes $E_{(1,1)}$ to $E_{(M,N)}$, circuit modules $T_{(1,1)}$ to $T_{(M,N)}$, and conductors $R_1$ to $R_M$ and $C_1$ to $C_N$ of the example pixel layout 1200A, as described above with reference to FIG. 12A. However, in pixel layout 1200B, pixel electrodes $E_{(1,1)}$ to $E_{(M,N)}$ and conductors $R_1$ to $R_M$ and $C_1$ to $C_N$ adhere to a curved geometry different from that of the example pixel layout 1200A.

Figure 13A:
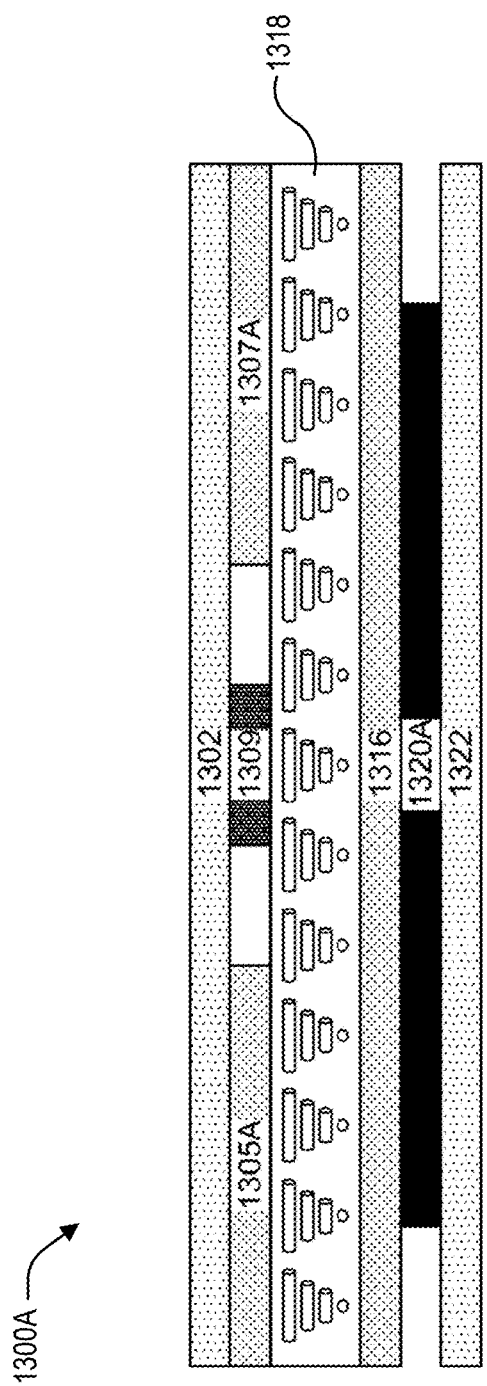
FIG. 13A depicts a cross-sectional view of a portion of an optically-transmissive spatial light modulator or display assembly for a see-through display system.

FIG. 13A depicts a cross-sectional view of a portion of an optically-transmissive spatial light modulator or display assembly 1300A for a see-through display system, according to some embodiments of the present disclosure. Assembly 1300A may, for example, correspond to an optically-transmissive controllable dimming assembly, an optically-transmissive LCD assembly, an optically-transmissive OLED display assembly, and the like. More specifically, the portion of assembly 1300A depicted in FIG. 13A includes a first optically-transmissive substrate 1302, a first pixel electrode 1305A, a second pixel electrode 1307A, a conductor 1309, a liquid crystal layer 1318, a common planar electrode 1316, a light-blocking mask 1320A, and a second optically-transmissive substrate 1322.

In some implementations, one or both of first and second optically-transmissive substrates 1302, 1322 may be made of glass. Pixel electrodes 1305A and 1305B may, for example, be neighboring pixel electrodes in an array of electrodes. For example, within the context of FIGS. 12A and 12B, first and second pixel electrodes 1305A, 1305B may correspond to pixel electrodes $E_{(1,1)}$ and $E_{(1,2)}$, respectively. Similarly, in this example, conductor 1309 may correspond to conductor $C_2$, which is disposed between pixel electrodes $E_{(1,1)}$ and $E_{(1,2)}$ in FIGS. 12A and 12B. In another example, elements 1305A, 1307A, and 1309 of assembly 1300A may correspond to pixel electrodes $E_{(1,1)}$, $E_{(2,1)}$, and conductor $R_2$ as described above with reference to FIGS. 12A and 12B, respectively. As shown in FIG. 13A, there may be gaps or channels between each of elements 1305A, 1307A, and 1309.

Light-blocking mask 1320A may be positioned in alignment with the conductor 1309 and, in some implementations, may be wider than the spacing between pixel electrodes 1305A and 1307A. In this way, light-blocking mask 1320A may effectively interact with any light that might pass through the gap(s) or channel(s) between pixel electrodes 1305A and 1307A. In general, light-blocking mask 1320A may be configured to absorb, reflect, or otherwise impede the transmission light incident thereon to some extent. As such, light-blocking mask 1320A may serve to prevent crosstalk between neighboring pixel electrodes 1305A and 1307A, and may serve to block or attenuate light that might pass between pixel electrodes 1305A and 1307A. Such functionality can be useful in both spatial light modulators and displays of see-through display systems alike.

Given the functionality of light-blocking mask 1320A, the geometry of light-blocking mask 1320A may also be curved and/or follow the contours of one or more of elements 1305A, 1307A, and 1309. In some examples, light-blocking mask 1320A as depicted in FIG. 13A may represent a portion of a larger light-blocking mask or matrix spanning throughout an array of pixels. In some implementations, light-blocking mask 1320A may take the form of a quantity of one or more materials deposited over the optically-transmissive substrate 1322. Such one or more materials may, for example, include resins, chromium, and other materials configured to absorb and/or reflect light. In some examples, light-blocking mask 1320A may be implemented at another layer of assembly 1300A. For instance, in some implementations, the light-blocking mask 1320A may be deposited over conductor 1309, the gaps or channels to either side of conductor 1309, and/or portions of pixel electrodes 1305A and 1307A. In such implementations, light-blocking mask 1320A may be in direct contact with optically-transmissive substrate 1302 and/or liquid crystal layer 1318.

Figure 13B:
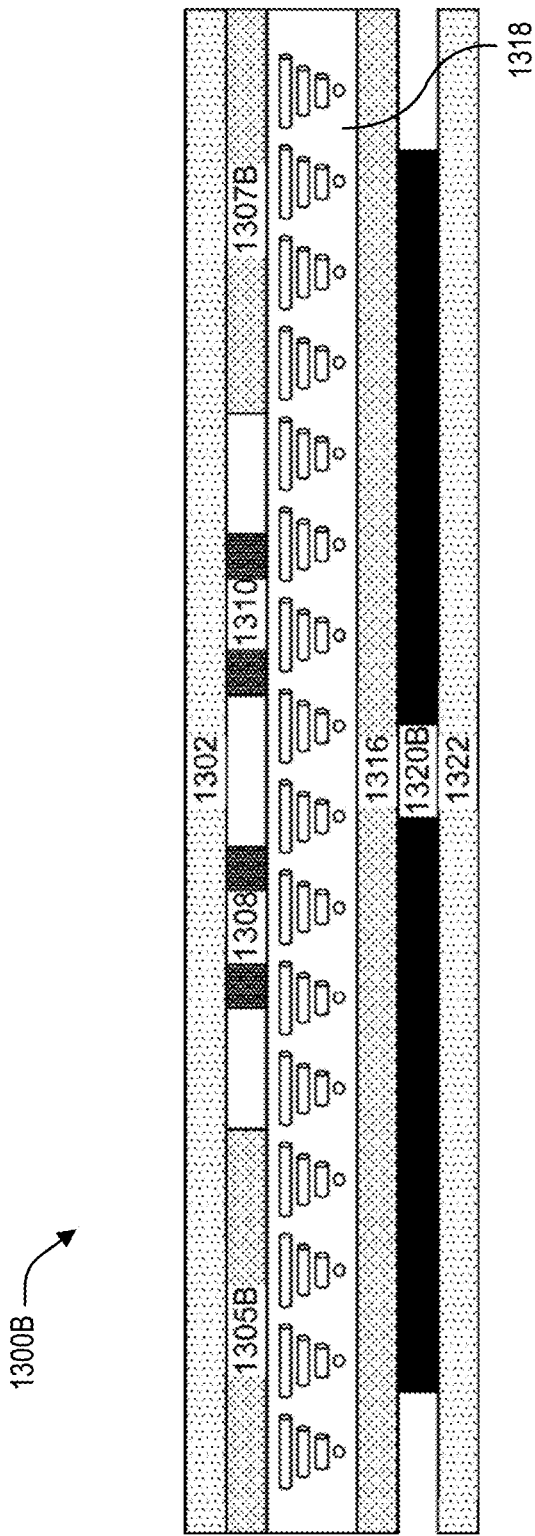
FIG. 13B depicts a cross-sectional view of a portion of an optically-transmissive spatial light modulator or display assembly for a see-through display system.
Figure 14B:
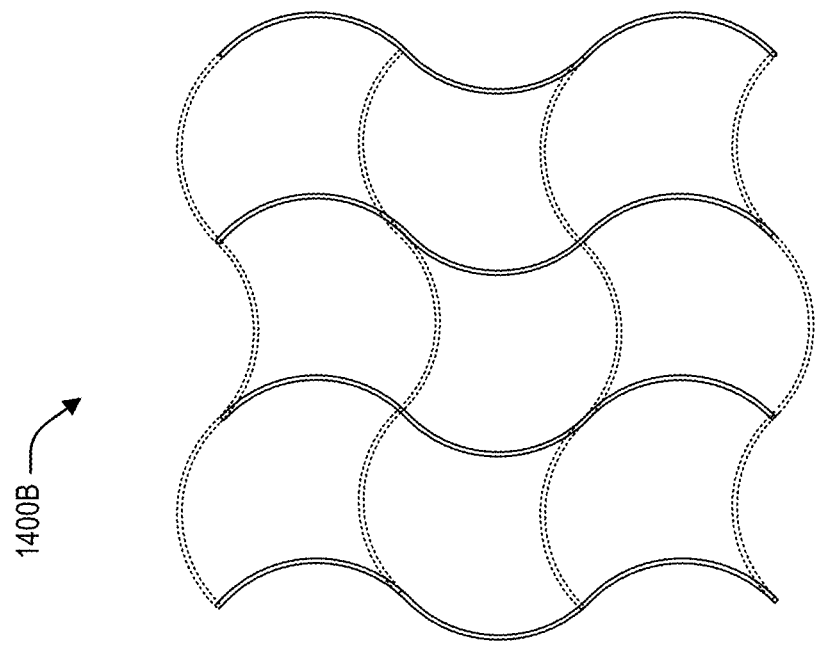
FIGS. 14A, 14B, 14C, and 14D show example curved geometries.
Figure 14A:
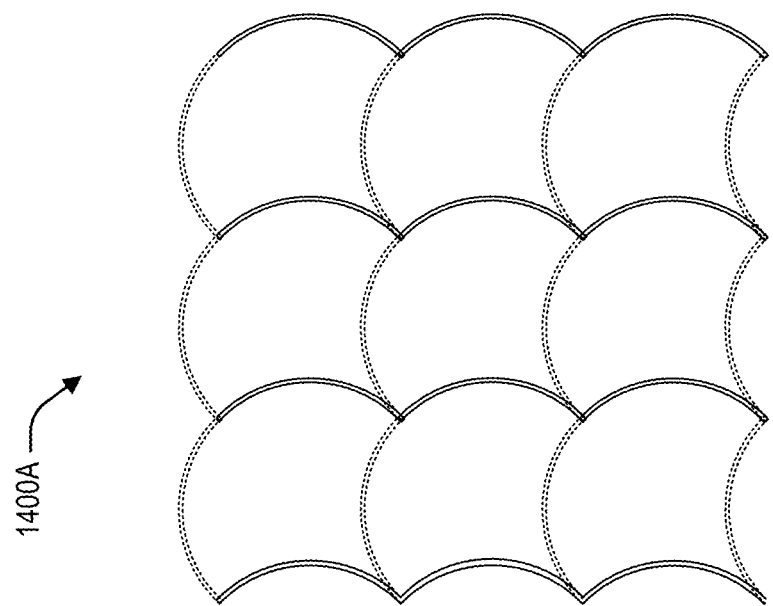
Figure 14D:
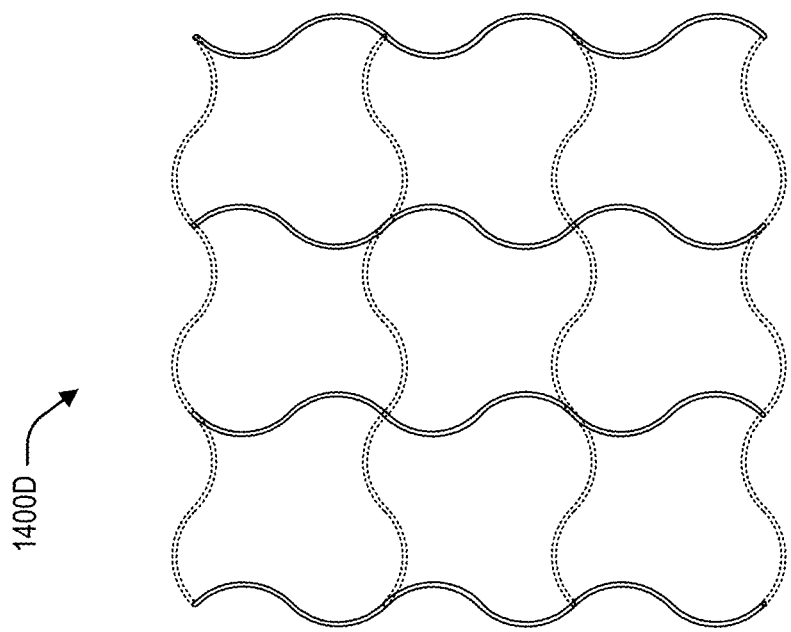
Figure 14C:
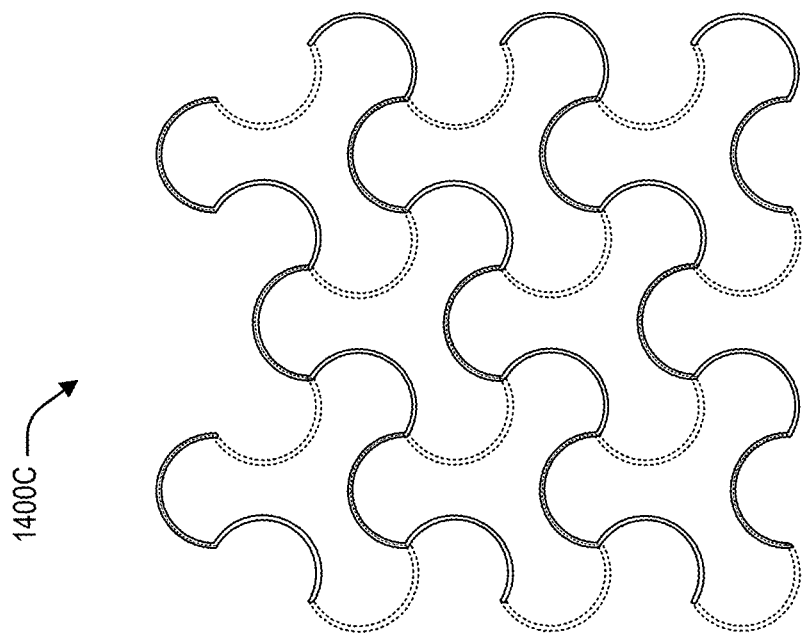

In some implementations, a display system is provided that includes an assembly (e.g., assembly 1300A). The assembly may include a first optically-transmissive substrate (e.g., first optically-transmissive substrate 1302) upon which a first set of one or more electrodes (e.g., pixel electrodes 1305A and 1307A) are disposed. The assembly may also include a second optically-transmissive substrate (e.g., second optically-transmissive substrate 1322) upon which a second set of one or more electrodes (e.g., common planar electrode 1316) are disposed. The assembly may further include one or more layers (e.g., liquid crystal layer 1318) that are positioned between the first set of one or more electrodes and the second set of one or more electrodes that respond to electric fields. The assembly may further include a quantity of material (e.g., light-blocking mask 1320A) disposed in a particular geometric pattern over the second optically-transmissive substrate, where the particular geometric pattern includes a plurality of curved segments. The assembly may further include control circuitry (e.g., COG 1014 of FIG. 10) that is electrically coupled to the first set of one or more electrodes and the second set of one or more electrodes. The control circuitry may be configured to apply electrical signals to one or both of the first and second sets of one or more electrodes to selectively generate one or more electric fields across the one or more layers FIG. 13B depicts a cross-sectional view of a portion of an optically-transmissive spatial light modulator or display assembly 1300B for a see-through display system, according to some embodiments of the present disclosure. More specifically, the portion of assembly 1300B depicted in FIG. 13B includes a first optically-transmissive substrate 1302, a first pixel electrode 1305B, a second pixel electrode 1307B, a first conductor 1308, a second conductor 1310, a liquid crystal layer 1318, a common planar electrode 1316, a light-blocking mask 1320B, and a second optically-transmissive substrate 1322.

In some examples, elements 1302, 1318, 1316, and 1322 of assembly 1300B may correspond to elements 1302, 1318, 1316, and 1322 of assembly 1300A as described above with reference to FIG. 13A. The primary difference between assembly 1300A and assembly 1300B is that, in assembly 1300B, two conductors (e.g., conductors 1308 and 1310) are disposed between neighboring pixel electrodes (e.g., pixel electrodes 1305B and 1307B), whereas in assembly 1300A, a single conductor is (e.g., conductor 1309) is disposed between neighboring electrodes (e.g., pixel electrodes 1305A and 1307A). As such, the spacing between pixel electrodes 1305B and 1307B is greater than the spacing between pixel electrodes 1305A and 1307A. The configuration of FIG. 13B may, for instance, be employed in examples where certain pixel array wiring and control schemes, such as "dual gate" wiring and control schemes, are implemented. Given the relatively large spacing between pixel electrodes 1305B and 1307B, it follows that light-blocking mask 1320B may be relatively wide.

Beyond the abovementioned differences, elements 1305B, 1307B, and 1320B of assembly 1300B may function in a manner similar or equivalent to elements 1305A, 1307A, and 1320A of assembly 1300A as described above with reference to FIG. 13A. As such, in some examples, elements 1305B and 1307B of assembly 1300B may correspond to pixel electrodes $E_{(1,1)}$ and $E_{(1,2)}$ as described above with reference to FIGS. 12A and 12B, respectively. In other examples, elements 1305B and 1307B of assembly 1300B may correspond to pixel electrodes $E_{(1,1)}$ and $E_{(2,1)}$ as described above with reference to FIGS. 12A and 12B, respectively. In some implementations, assemblies 1300A and 1300B may represent different portions of the same assembly. For example, in such implementations, elements 1305A and 1307A of assembly 1300A may correspond to pixel electrodes $E_{(1,1)}$ and $E_{(1,2)}$ as described above with reference to FIGS. 12A and 12B, respectively, and elements 1305B and 1307B of assembly 1300B may correspond to pixel electrodes $E_{(1,1)}$ and $E_{(2,1)}$ as described above with reference to FIGS. 12A and 12B, respectively, or vice versa. In these implementations, the width of each pixel electrode may differ from the height of the same pixel due to the difference in the size of the gaps or channels between horizontally- and vertically-neighboring pixel electrodes. Such a difference in width and height may, however, allow the pixel pitch to be maintained at a constant value throughout an entire array of pixels.

FIGS. 14A, 14B, 14C, and 14D show example curved geometries 1400A, 1400B, 1400C, and 1400D, respectively, according to some embodiments of the present disclosure. In some implementations, one or more of example curved geometries 1400A, 1400B, 1400C, and 1400D may be employed in one or more of the systems described herein in place the curved geometry of FIG. 12A or the curved geometry of FIG. 12B. In some implementations, the lines that define each of one or more of example curved geometries 1400A, 1400B, 1400C, and 1400D may be representative of the outer perimeters of pixel electrodes, the path taken by conductors between neighboring pixel electrodes, and/or the pattern of a light-blocking mask or matrix.

Similar to the curved geometries of FIGS. 12A and 12B, curved geometries 1400A, 1400B, 1400C, and 1400D may correspond to patterns of concatenated semi-circles, such as half circles and/or quarter circles. In addition, it can be seen that the lines of example curved geometries 1400A, 1400B, 1400C, and 1400D define arrays of shapes that tessellate in much the same way as the lines of the curved geometries of FIGS. 12A and 12B do. And, also like the curved geometries of FIGS. 12A and 12B, a relatively large range of different angular components may be represented in curved geometries 1400A, 1400B, 1400C, and 1400D, such that the diffraction spikes or streaks associated with such geometries appear to radiate or emanate from each light source at a large range of different angles. Furthermore, the distribution of different angular components represented in curved geometries 1400A, 1400B, 1400C, and 1400D may be relatively uniform, such that individual spikes or streaks are less distinguishable in the diffraction patterns associated with such geometries.

Figure 15:
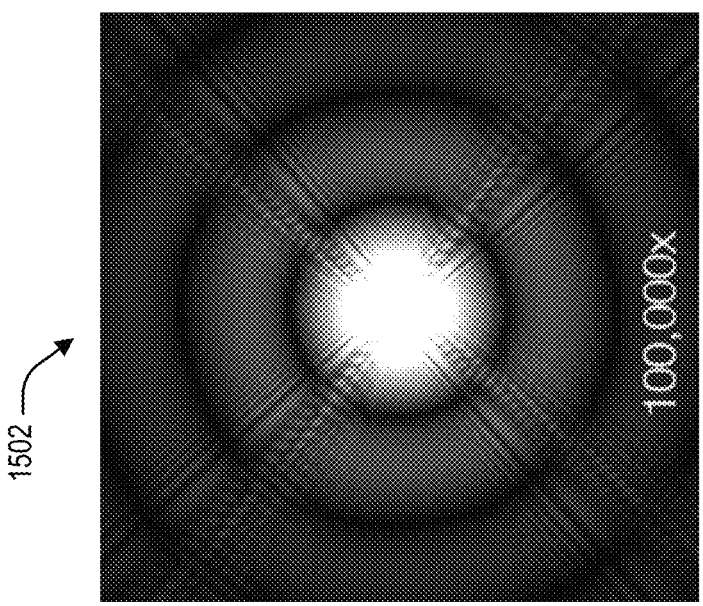
FIG. 15 shows an example pixel layout and a corresponding PSF.
Figure 15:
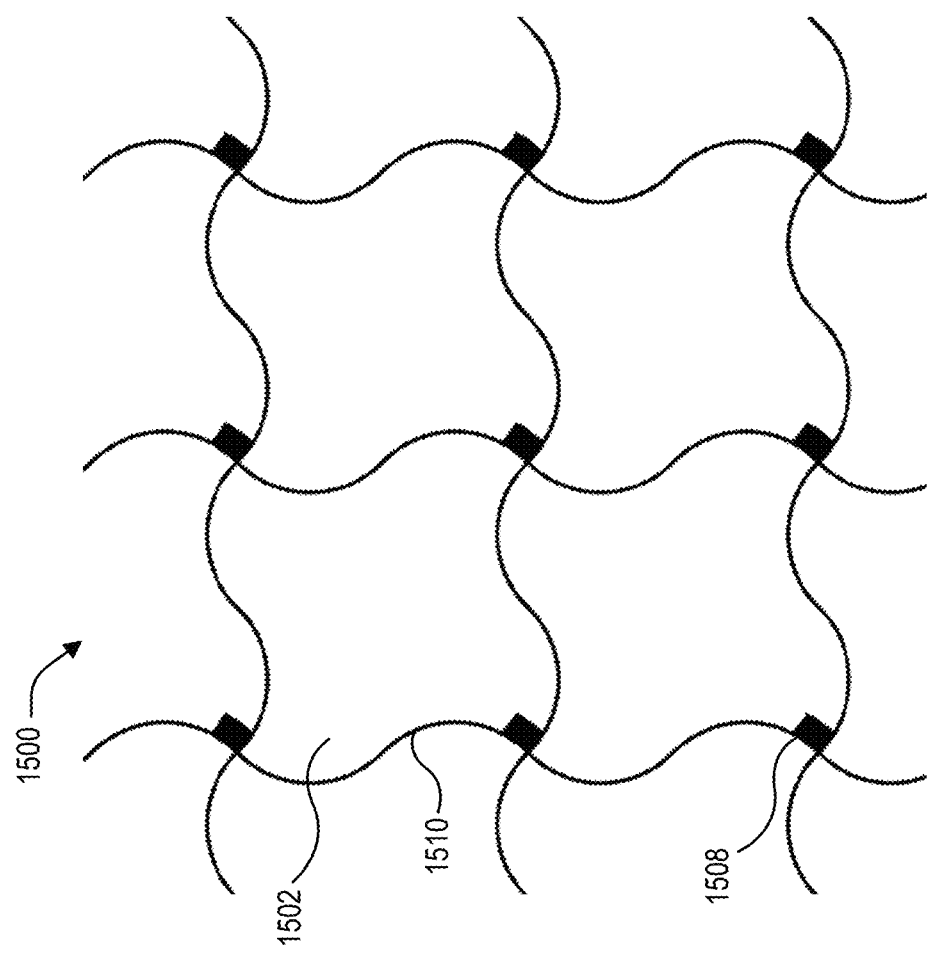

FIG. 15 shows an example pixel layout 1500 and a corresponding PSF 1502, according to some embodiments of the present disclosure. In the illustrated example, pixel layout 1500 includes the curved geometry of FIG. 12A, and further includes pixel electrodes 1502, circuit modules 1508, and conductors 1510. In some embodiments, pixel layout 1500 may include a light-blocking mask that is at least partially curved and covers the footprint of one or more of elements 1502, 1508, and 1510. In some embodiments, portions of the light-blocking mask may have a slightly larger footprint than the footprint of one or more of elements 1502, 1508, and 1510. Alternatively or additionally, portions of the light-blocking mask may have a slightly smaller footprint than the footprint of one or more of elements 1502, 1508, and 1510.

Figure 16:
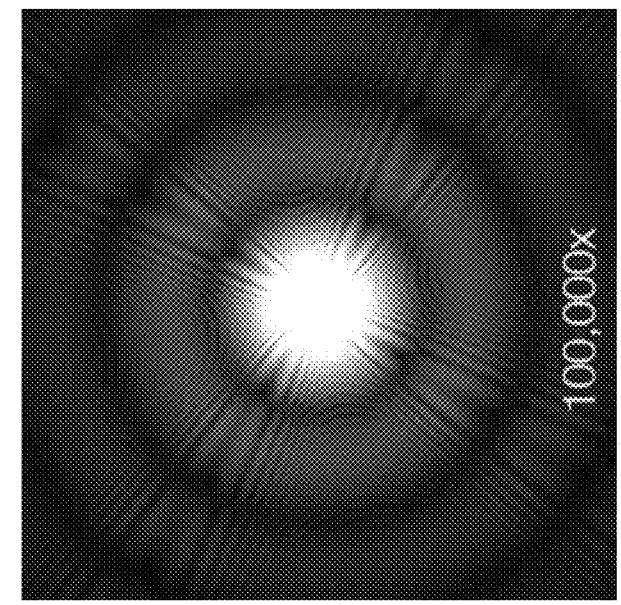
FIG. 16 shows an example pixel layout and a corresponding PSF.
Figure 16:
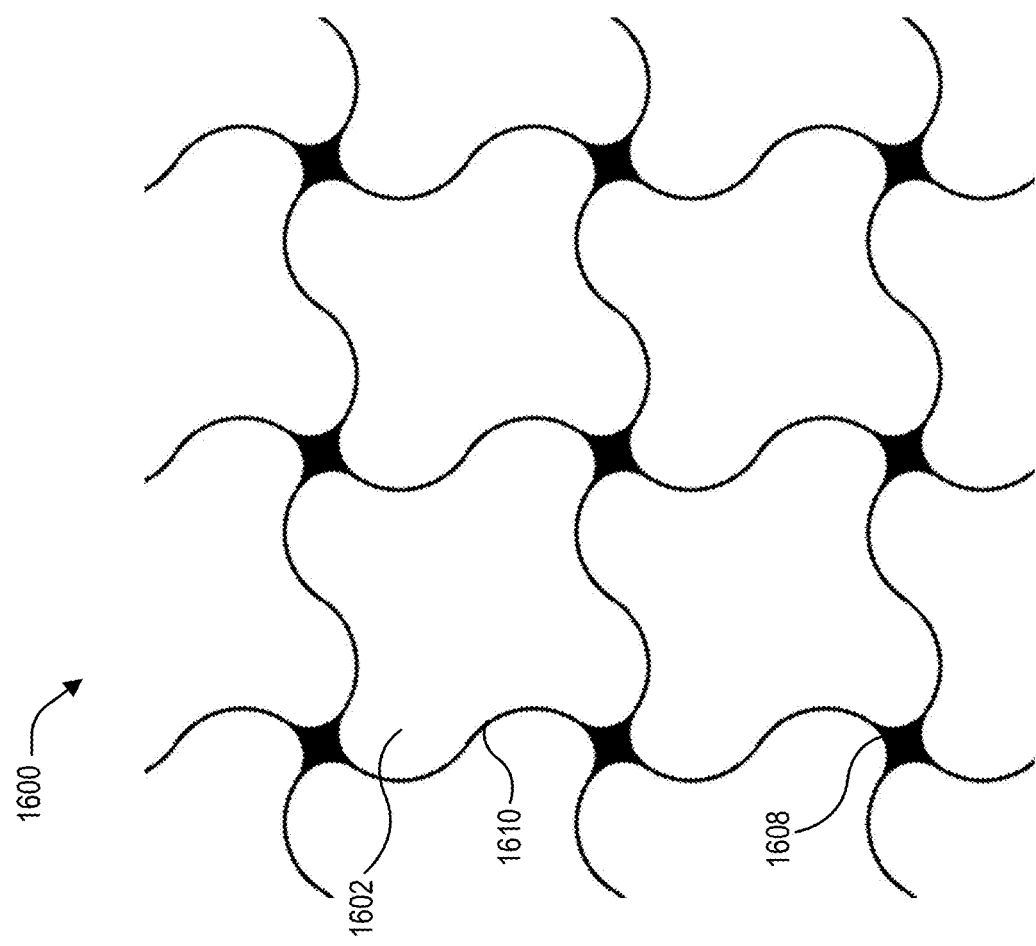

FIG. 16 shows an example pixel layout 1600 and a corresponding PSF 1602, according to some embodiments of the present disclosure. In the illustrated example, pixel layout 1600 includes a curved geometry similar to that shown in FIG. 12A, and further includes pixel electrodes 1602, circuit modules 1608, and conductors 1610. In some embodiments, pixel layout 1600 may include a light-blocking mask that is curved and covers the footprint of one or more of elements 1602, 1608, and 1610. In some embodiments, portions of the light-blocking mask may have a slightly larger footprint than the footprint of one or more of elements 1602, 1608, and 1610. Alternatively or additionally, portions of the light-blocking mask may have a slightly smaller footprint than the footprint of one or more of elements 1602, 1608, and 1610.

Pixel layout 1600 differs from pixel layout 1500 in that the regions where circuit modules 1608 are located have curved geometries whereas the regions where circuit modules 1508 are located have straight edges and sharp corners. In some implementations, circuit modules 1608 themselves may include curved edges. In some implementations, the combination of circuit modules 1608 and conductors 1610 may form curved edges at the regions where circuit modules 1608 are located. In some implementations, the combination of the light-blocking mask, circuit modules 1608, and conductors 1610 may form curved edges at the regions where circuit modules 1608 are located. In some implementations, the light-blocking mask may have a larger footprint than both circuit modules 1608 and conductors 1610 and may have a curved footprint at the regions where circuit modules 1608 are located.

Figure 17:
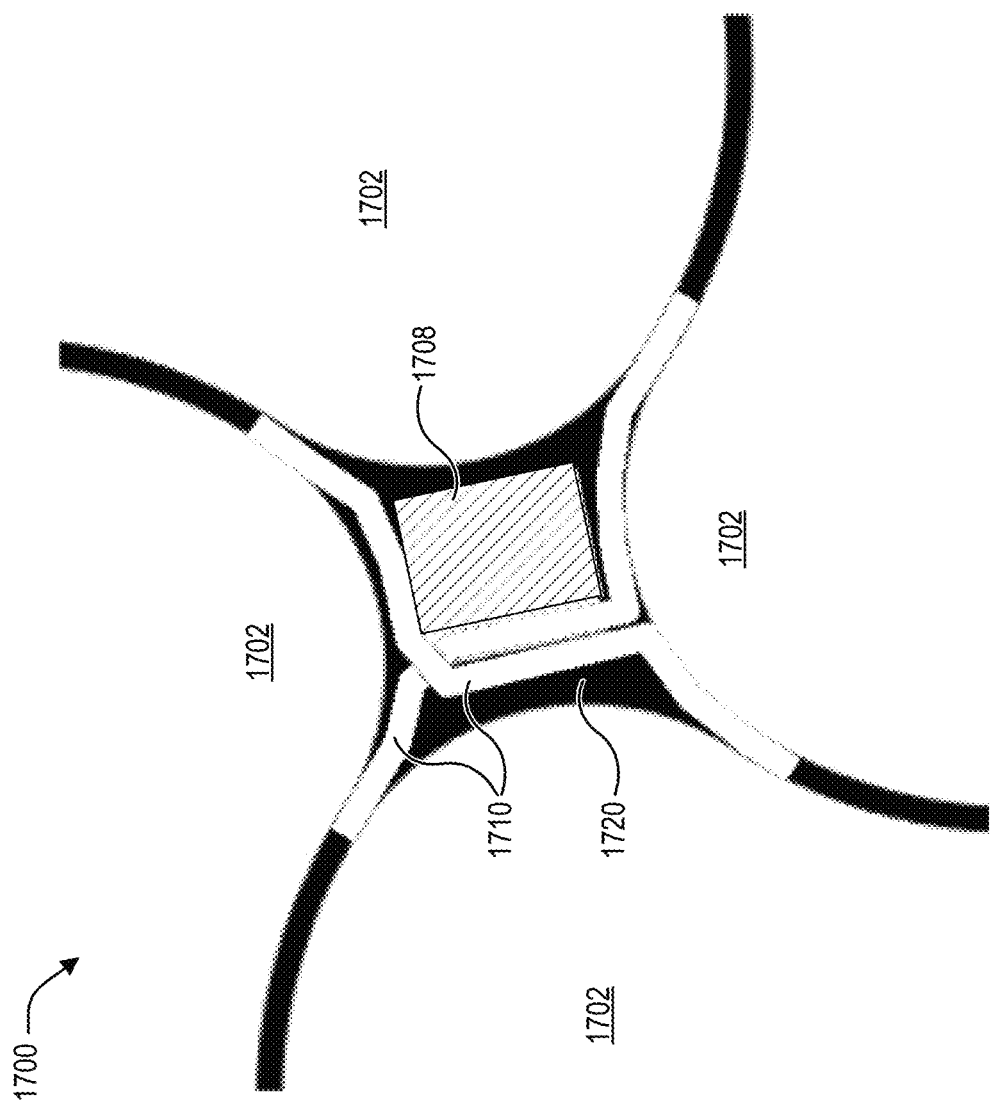
FIG. 17 shows a portion of an example pixel layout.

FIG. 17 shows a portion of an example pixel layout 1700, according to some embodiments of the present disclosure. In the illustrated example, pixel layout 1700 may correspond to pixel layout 1600. Pixel layout 1700 includes pixel electrodes 1702, a circuit module 1708, conductors 1710, and a light-blocking mask 1720. The footprint of light-blocking mask 1720 is curved and is larger than the collective footprint of circuit module 1708 and conductors 1710 at the region where circuit module 1708 is located. As shown, circuit module 1708 can be positioned so that conductors 1710 can be routed around circuit module 1708 so that each of these elements can fit within the curved footprint of light-blocking mask 1720. It should be noted that conductors 1710 are obscured moving away from circuit module 1708 for illustrative purposes only (e.g., to illustrate that light-blocking mask 1720 may have a similar footprint to conductors 1710 at certain regions of pixel layout 1700). In should be understood that conductors 1710 may continue to extend toward neighboring circuit modules of pixel layout 1700.

Figures 18A, 18B:
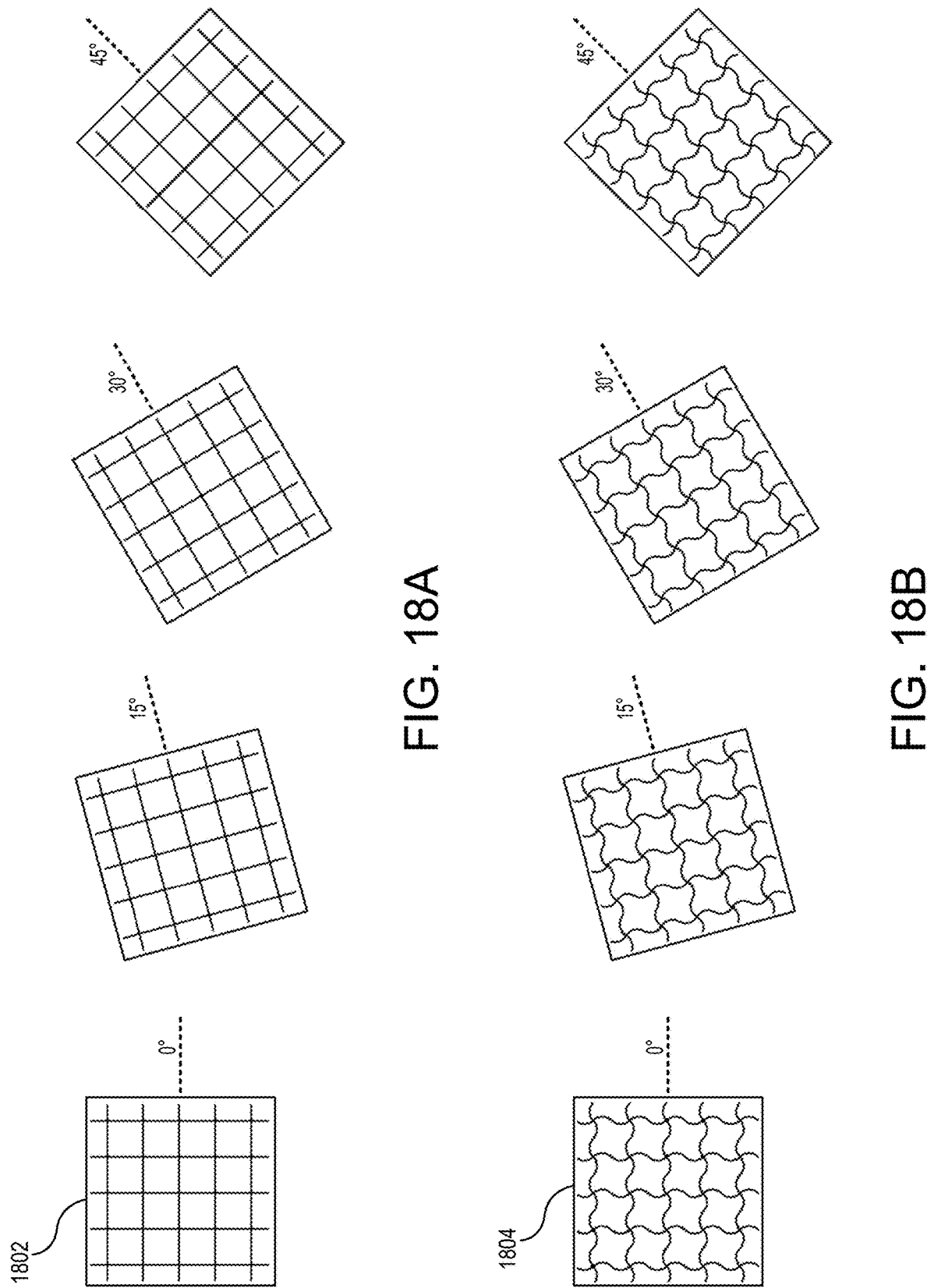
FIGS. 18A and 18B show various example tilting configurations for pixel layouts that may be employed to reduce the "screen door" artifact.

FIGS. 18A and 18B show various example tilting configurations for pixel layouts that may be employed to reduce the "screen door" artifact, according to some embodiments of the present disclosure. FIG. 18A shows tilting of a pixel layout 1802 with a rectangular geometry at tilt angles of 0°, 15°, 30°, and 45°. FIG. 18B shows tilting of a pixel layout 1804 with a curved geometry (e.g., quarter circle) at tilt angles of 0°, 15°, 30°, and 45°.

Figure 19:
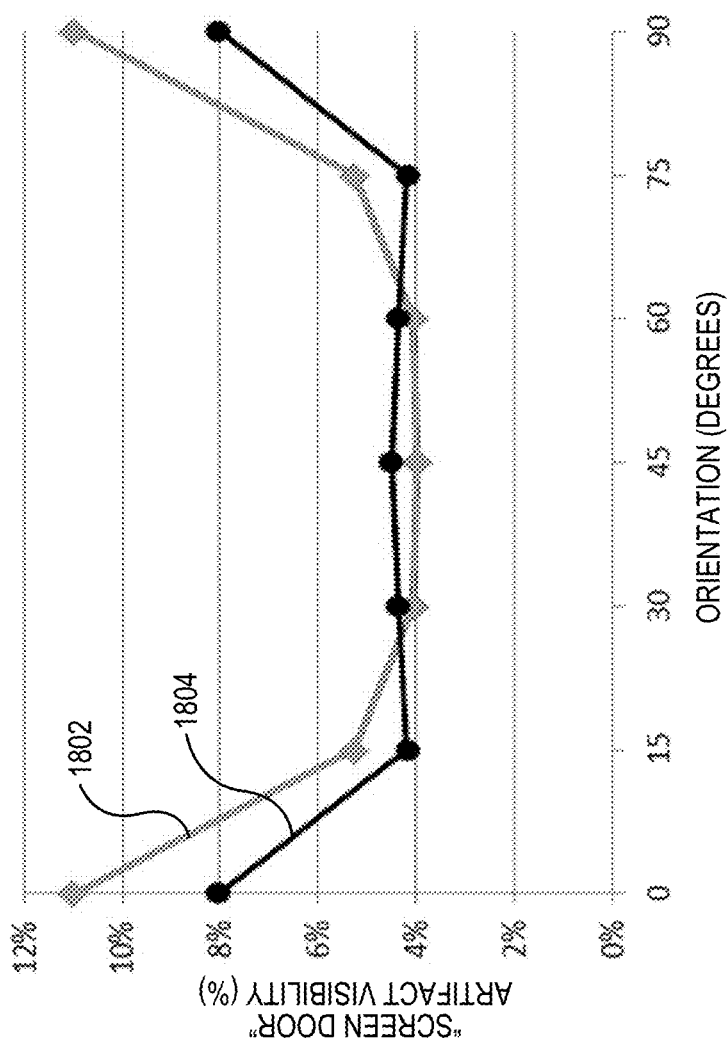
FIG. 19 shows an example plot showing the effect of different tilting configurations on the visibility of the "screen door" artifact.

FIG. 19 shows an example plot showing the effect of the different tilting configurations of FIGS. 18A and 18B on the visibility of the "screen door" artifact, according to some embodiments of the present disclosure. Specifically, the visibility of the "screen door" artifact as a percentage is plotted for orientations between 0° and 90° at 15° increments for pixel layout 1802 with a rectangular geometry and pixel layout 1804 with a curved geometry. A significant decrease in the visibility is shown for both geometries for tilt angels between 15° and 75°. A minimum visibility is observed for pixel layout 1802 at 45° and a minimum visibilities are observed for pixel layout 1804 at 15° and 75°.

Figure 20:
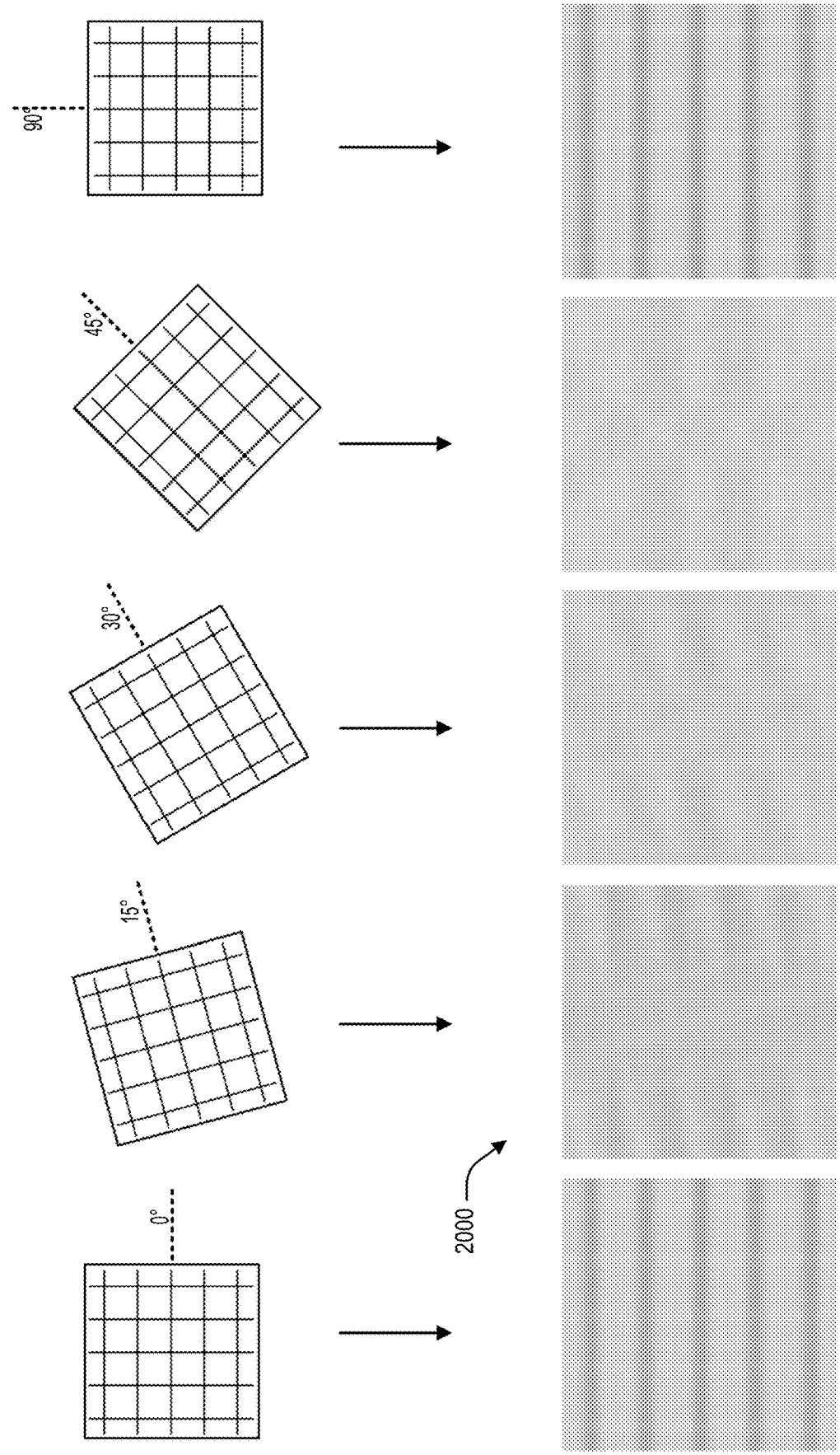
FIG. 20 shows example images showing the visibility of the "screen door" artifact for different tilting configurations.

FIG. 20 shows example images 2000 showing the visibility of the "screen door" artifact for the different tilting configurations of FIG. 18A, according to some embodiments of the present disclosure. As can be observed in example images 2000, the visibility of the "screen door" artifact decreases significantly as the tilt angle increases between 0° and 45°.

Figure 21:
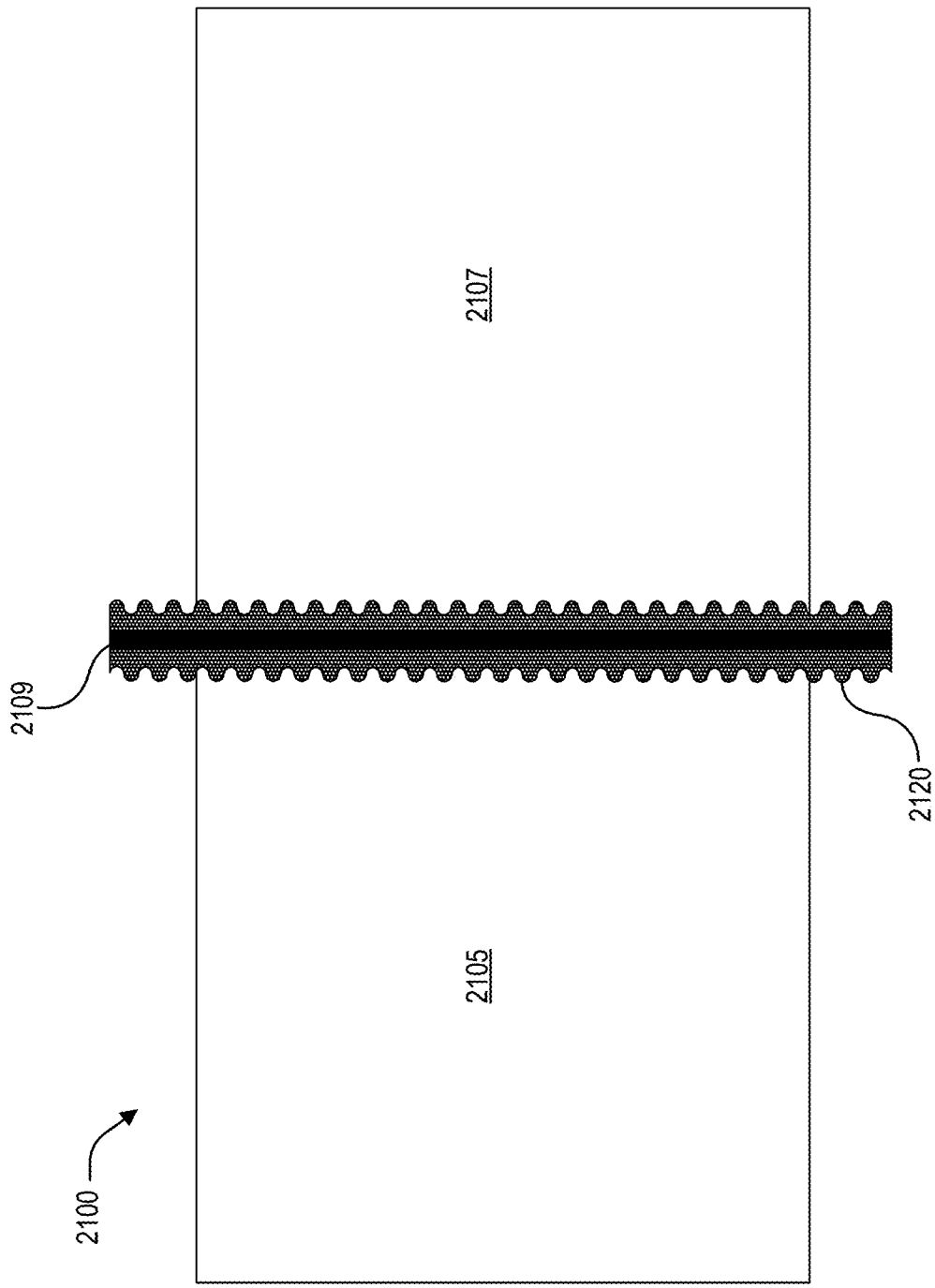
FIG. 21 shows an example pixel layout.

FIG. 21 shows an example pixel layout 2100 including a first electrode 2105, a second electrode 2107, a conductor 2109, and a light-blocking mask 2120, according to some embodiments of the present disclosure. Referring again to FIG. 13A, elements 2105, 2107, 2109, and 2120 of pixel layout 2100 may, for example, correspond to elements 1305A, 1307A, 1309, and 1320A, respectively. As such, in some implementations, one or more glass substrate and/or liquid crystal layers may be positioned adjacent to one or more of 2105, 2107, 2109, and 2120 of the example pixel layout 2100. Notably, it can be seen that neighboring pixel electrodes 2105 and 2107 do not have curved geometries, but are square or rectangular in shape. Similarly, the conductor 2109, which is positioned in the space between neighboring pixel electrodes 2105 and 2107, is relatively straight.

For these reasons, elements 2105, 2107, and 2109 might be expected to yield diffraction patterns similar to those described above with reference to FIGS. 7B, 8A, and 8B. However, as can be seen in FIG. 21, in some implementations, light-blocking mask 2120 may have a curved geometry and be wide enough to intercept any light that might interact with one or both of the opposing edges of neighboring pixel electrodes 2105 and 2107 and/or conductor 1309. As such, pixel layout 2100 may still yield an advantageous diffraction pattern by virtue of the size, positioning, and curved geometry of light-blocking mask 2120. In some examples, light-blocking mask 2120 may represent a portion of a larger light-blocking mask or matrix spanning throughout an array of pixels.

Although described primarily within the context of optically-transmissive spatial light modulators and displays, such as controllable dimming assemblies, LCD systems, and OLED displays, it is to be understood that one or more of the configurations and techniques described herein may be leveraged in other systems with see-through pixel arrays. For example, in some implementations, one or more of the curved geometries and associated principles of operation described herein may be leveraged in optically-transmissive imaging devices, such as see-through CMOS sensors, which may be included as part of a see-through display system, camera, or other device.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A dimming assembly comprising:
an optically-transmissive substrate;
a plurality of electronic components disposed on the optically-transmissive substrate, the plurality of electronic components comprising:
a plurality of electrodes that are arranged spaced apart from one another in a two-dimensional array along a first direction and a second direction, the second direction being different than the first direction, wherein each of the plurality of electrodes has a two-dimensional geometry corresponding to a shape with a plurality of curved sides;
a plurality of conductors that are arranged within channels between neighboring electrodes from the plurality of electrodes in a two-dimensional lattice, wherein each of the plurality of conductors follows a curving path that conforms to the two-dimensional geometry of the plurality of electrodes, wherein a particular channel of the channels formed only between a first electrode and a second electrode of the plurality of electrodes includes a first conductor and a second conductor arranged within the particular channel and following a curving path of the particular channel, the second conductor being separate from the first conductor, and wherein the first conductor extends across the dimming assembly along the first direction and the second conductor extends across the dimming assembly along the second direction; and
a plurality of circuit modules that are arranged adjacent to the plurality of electrodes in a two-dimensional array, wherein each of the plurality of circuit modules is electrically coupled to (i) a respective electrode from the plurality of electrodes, and (ii) a respective pair of conductors from the plurality of conductors;
a planar electrode layer that is positioned in alignment with the plurality of electrodes;
one or more layers that are positioned between the optically-transmissive substrate and the planar electrode layer, wherein the one or more layers comprise one or more layers of material that respond to electric fields;
a light-blocking mask that is positioned in alignment with the plurality of conductors, wherein a width of the light-blocking mask is greater than a width of the channels between the neighboring electrodes, and wherein the light-blocking mask is configured to impede light from passing between the plurality of electrodes; and
control circuitry electrically coupled to the plurality of conductors and the planar electrode layer, the control circuitry configured to apply electrical signals to the plurality of circuit modules by way of the plurality of conductors to selectively generate one or more electric fields between the planar electrode layer and one or more of the plurality of electrodes in the two-dimensional array, respectively.

2. A display system comprising:
a substrate;
a plurality of electronic components disposed on the substrate, the plurality of electronic components comprising:
a plurality of pixels that are arranged in a two-dimensional array along a first direction and a second direction, the second direction being different than the first direction, wherein each of the plurality of pixels has a two-dimensional geometry corresponding to a shape with at least one curved side;
a plurality of conductors that are arranged within channels between neighboring pixels from the plurality of pixels, wherein a particular channel of the channels formed only between a first pixel and a second pixel of the plurality of pixels includes a first conductor and a second conductor arranged within the particular channel and following a curving path of the particular channel, the second conductor being separate from the first conductor, and wherein the first conductor extends across the display system along the first direction and the second conductor extends across the display system along the second direction; and a plurality of circuit modules that are arranged adjacent to the plurality of pixels, wherein each of the plurality of circuit modules is electrically coupled to a respective pixel from the plurality of pixels and at least one conductor from the plurality of conductors;

a light-blocking mask that is positioned in alignment with the plurality of conductors, wherein a width of the light-blocking mask is greater than a width of the channels between the neighboring pixels, and wherein the light-blocking mask is configured to impede light from passing between the plurality of pixels; and control circuitry electrically coupled to the plurality of conductors, the control circuitry configured to apply electrical signals to the plurality of circuit modules by way of the plurality of conductors.

3. The display system of claim 2, wherein each of the plurality of conductors follows a curving path that conforms to the two-dimensional geometry of the plurality of pixels.

4. The display system of claim 2, wherein the substrate is an optically-transmissive substrate.

5. The display system of claim 2, wherein the plurality of pixels are a plurality of electrodes.

6. The display system of claim 2, further comprising:
a planar electrode layer that is positioned in alignment with the plurality of pixels.

7. The display system of claim 6, further comprising:
one or more layers that are positioned between the substrate and the planar electrode layer, wherein the one or more layers comprise one or more layers of material that respond to electric fields.

8. The display system of claim 6, wherein the control circuitry is further electrically coupled to the planar electrode layer.

9. The display system of claim 8, wherein the control circuitry configured to apply electrical signals to the plurality of circuit modules by way of the plurality of conductors to selectively generate one or more electric fields between the planar electrode layer and one or more of the plurality of pixels in the two-dimensional array, respectively.

10. The display system of claim 2, wherein each of the plurality of circuit modules is electrically coupled to a pair of conductors from the plurality of conductors.

11. The display system of claim 2, wherein each of the shapes includes a plurality of curved sides.

12. The display system of claim 2, wherein the plurality of pixels form a particular tessellation.

13. A display system comprising:
a first optically-transmissive substrate upon which a first set of one or more electrodes are disposed;
a second optically-transmissive substrate upon which a second set of one or more electrodes are disposed;
a plurality of conductors that are arranged within channels between neighboring electrodes from either the first set of one or more electrodes or the second set of one or more electrodes, wherein a particular channel of the channels formed only between a first electrode and a second electrode includes a first conductor and a second conductor arranged within the particular channel and following a curving path of the particular channel, the second conductor being separate from the first conductor, and wherein the first conductor extends across the display system along a first direction and the second conductor extends across the display system along a second direction, the second direction being different than the first direction;
one or more layers that are positioned between the first set of one or more electrodes and the second set of one or more electrodes, wherein the one or more layers comprise one or more layers of material that respond to electric fields;
a quantity of material disposed in a particular geometric pattern over the second optically-transmissive substrate, wherein the quantity of material includes a light-blocking mask that is configured to impede light from passing between the first set of one or more electrodes or the second set of one or more electrodes, wherein a width of the light-blocking mask is greater than a width of the channels between the neighboring electrodes, and wherein the particular geometric pattern includes a plurality of curved segments; and
control circuitry electrically coupled to the first set of one or more electrodes and the second set of one or more electrodes, the control circuitry configured to apply electrical signals to one or both of the first and second sets of one or more electrodes to selectively generate one or more electric fields across the one or more layers.

14. The display system of claim 13, wherein each of the plurality of curved segments is disposed in alignment with an edge of a respective electrode from the first set of one or more electrodes or the second set of one or more electrodes.

15. The display system of claim 14, wherein the edge of the respective electrode with which each of the plurality of curved segments is aligned has a curved geometry.

16. The display system of claim 15, wherein the curved geometry is semicircular, serpentine, sinusoidal, or a combination thereof.

17. The display system of claim 14, wherein the edge of the respective electrode with which each of the plurality of curved segments is aligned corresponds to a sinuosity value that is less than or equal to a value of 1.02.

18. The display system of claim 13, wherein the quantity of material disposed over the second optically-transmissive substrate comprises a quantity of resin or chromium.

19. The display system of claim 13, wherein a point spread function (PSF) of the particular geometric pattern corresponds to an Airy pattern.

20. The display system of claim 13, wherein the particular geometric pattern corresponds to a particular tessellation.

* * * * *